United States Patent
Chen et al.

(10) Patent No.: US 12,200,587 B2
(45) Date of Patent: Jan. 14, 2025

(54) METHOD FOR IMPLEMENTING FUNCTIONS BY USING NFC TAG, ELECTRONIC DEVICE, AND SYSTEM

(71) Applicant: Huawei Technologies Co., Ltd., Shenzhen (CN)

(72) Inventors: ChiaHao Chen, Shenzhen (CN); Zhendong Yao, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/630,015

(22) PCT Filed: Jul. 17, 2020

(86) PCT No.: PCT/CN2020/102858
§ 371 (c)(1),
(2) Date: Jan. 25, 2022

(87) PCT Pub. No.: WO2021/017909
PCT Pub. Date: Feb. 4, 2021

(65) Prior Publication Data
US 2022/0256321 A1   Aug. 11, 2022

(30) Foreign Application Priority Data
Jul. 26, 2019   (CN) .......................... 201910684439.3

(51) Int. Cl.
*H04W 4/80*   (2018.01)
*H04R 5/04*   (2006.01)

(52) U.S. Cl.
CPC ................ *H04W 4/80* (2018.02); *H04R 5/04* (2013.01); *H04R 2420/07* (2013.01)

(58) Field of Classification Search
CPC ....... H04W 4/80; H04R 5/04; H04R 2420/07; G06F 3/14; H04S 3/00
USPC ....................................................... 455/41.3
See application file for complete search history.

(56) References Cited

U.S. PATENT DOCUMENTS

| | | |
|---|---|---|
| 9,998,848 B2 | 6/2018 | Adhikari |
| 2011/0210831 A1 | 9/2011 | Talty et al. |
| 2013/0106776 A1 | 5/2013 | Park et al. |
| 2014/0057569 A1* | 2/2014 | Toivanen .......... H04M 1/72412 455/41.3 |
| 2014/0120961 A1* | 5/2014 | Buck ....................... G06F 1/329 455/466 |
| 2014/0285312 A1 | 9/2014 | Laaksonen et al. |

(Continued)

FOREIGN PATENT DOCUMENTS

| | | |
|---|---|---|
| CN | 103974457 A | 8/2014 |
| CN | 104202461 A | 12/2014 |

(Continued)

*Primary Examiner* — Eugene Yun
(74) *Attorney, Agent, or Firm* — Conley Rose, P.C.

(57) ABSTRACT

A method includes after a user touches a near-field communication (NFC) tag on a second electronic device using a first electronic device having an NFC function, a plurality of functions can be implemented simultaneously. For example, after the user holds a mobile phone to touch an NFC tag on a television, the mobile phone establishes a wireless connection to the television, and synchronizes a video being played on the mobile phone with the television for playing.

20 Claims, 23 Drawing Sheets

(56) References Cited

U.S. PATENT DOCUMENTS

2018/0183840 A1  6/2018 Lee
2019/0114039 A1  4/2019 Lindemann et al.

FOREIGN PATENT DOCUMENTS

| CN | 104469598 A | 3/2015 |
| CN | 104869523 A | 8/2015 |
| CN | 105094732 A | 11/2015 |
| CN | 105828235 A | 8/2016 |
| CN | 106303649 A | 1/2017 |
| CN | 109070749 A | 12/2018 |
| CN | 109716854 A | 5/2019 |
| CN | 111343622 A | 6/2020 |

* cited by examiner

CONT. FROM FIG. 2(a)

CONT. FROM FIG. 10(a)

METHOD FOR IMPLEMENTING FUNCTIONS BY USING NFC TAG, ELECTRONIC DEVICE, AND SYSTEM

CROSS-REFERENCE TO RELATED APPLICATIONS

This is a U.S. National Stage of International Patent Application No. PCT/CN2020/102858 filed on Jul. 17, 2020, which claims priority to Chinese Patent Application No. 201910684439.3 filed on Jul. 26, 2019. Both of the aforementioned applications are hereby incorporated by reference in their entireties.

TECHNICAL FIELD

This application relates to the field of electronic devices, and in particular, to a method for implementing functions by using a near field communication (Near Field Communication, NFC) tag, an electronic device, and a system.

BACKGROUND

NFC is a near field communication technology based on a carrier frequency of 13.56 megahertz (MHz), and allows non-contact point-to-point data transmission between devices. The NFC has relatively high security, and therefore is increasingly popular and accepted by the public in recent years. An electronic device having an NFC function develops particularly rapidly. The electronic device having the NFC function may work in three modes: a reader/writer mode, a card emulation mode, and a peer-to-peer mode.

In the reader/writer mode, the electronic device may be used as a contactless card reader to read information from an NFC tag (or referred to as an electronic tag), so as to implement a corresponding function by using the read information. For example, the electronic device is a mobile phone. When the mobile phone with the NFC function works in the reader/writer mode, a user can hold the mobile phone to touch an NFC tag on another device such as a television. In this case, the mobile phone may read the NFC tag on the television, to obtain information stored in the NFC tag. For example, the information stored in the NFC tag is used by the another device to establish a wireless connection to the television. The mobile phone can establish a wireless connection to the television based on the read information. That is, when working in the reader/writer mode, the mobile phone can complete establishment of a wireless connection to the television by touching the NFC tag on the television.

However, currently, by reading the NFC tag on the another device, the mobile phone can implement only one function, for example, establishing a wireless connection to the device, but cannot simultaneously implement a plurality of functions through one touch. Consequently, interaction efficiency is low.

SUMMARY

Embodiments of this application provide a method for implementing functions by using an NFC tag, an electronic device, and a system, to resolve a problem that only one function can be implemented by reading an NFC tag on a device, and a plurality of functions cannot be simultaneously implemented through one touch, resulting in low interaction efficiency.

To achieve the foregoing objective, the following technical solutions are used in this application.

According to a first aspect, an embodiment of this application provides a near field communication system. The near field communication system may include a first electronic device, a second electronic device, and a third electronic device. The first electronic device has an NFC function, and the second electronic device includes an NFC tag. The first electronic device is configured to: when a user touches the NFC tag of the second electronic device by using the first electronic device, read connection information stored in the NFC tag, and establish a first wireless connection to the second electronic device based on the connection information. The first electronic device is further configured to: determine that the first electronic device establishes a second wireless connection to the third electronic device, send first audio channel data to the second electronic device through the first wireless connection, and send second audio channel data to the third electronic device through the second wireless connection, where the first audio channel data and the second audio channel data are two pieces of audio channel data included in audio being played on the first electronic device. The second electronic device is configured to receive the first audio channel data through the first wireless connection and play the first audio channel data, and the third electronic device is configured to receive the second audio channel data through the second wireless connection and play the second audio channel data, to implement stereo audio output.

According to the foregoing technical solution, after the user touches the NFC tag on the second electronic device by using the first electronic device, the first electronic device can establish a wireless connection to the second electronic device, and when the first electronic device determines that the first electronic device also establishes a wireless connection to the third electronic device, the first electronic device can also synchronize one piece of audio channel data in the audio being played on the first electronic device with the second electronic device, and synchronize another piece of audio channel data with the third electronic device, so that the two electronic devices implement stereo audio output. That is, after the user touches an NFC tag on another electronic device by using an electronic device having the NFC function, a plurality of functions can be implemented simultaneously. In this way, a plurality of functions can be implemented simultaneously through one touch of the user, thereby improving interaction efficiency.

In a possible implementation, the first electronic device is further configured to: obtain current scenario information, and determine, based on the current scenario information, that an intention of the user to touch the NFC tag of the second electronic device by using the first electronic device is to synchronize the audio being played on the first electronic device with the second electronic device for playing. In this way, an actual intention of the user is obtained with reference to a current scenario, so that an automatically implemented function can meet a requirement of the user, thereby further improving interaction efficiency, and improving use experience of the user.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

In another possible implementation, both the second electronic device and the third electronic device may be sound boxes; or both the first wireless connection and the second wireless connection may be Bluetooth connections.

According to a second aspect, an embodiment of this application provides a near field communication system. The near field communication system may include a first electronic device and a second electronic device. The first electronic device has an NFC function, and the second electronic device includes an NFC tag. The first electronic device is configured to: when a user touches the NFC tag of the second electronic device by using the first electronic device, read connection information stored in the NFC tag, and establish a wireless connection to the second electronic device based on the read connection information. The first electronic device is further configured to: obtain current scenario information; determine, based on the current scenario information, that an intention of the user to touch the NFC tag of the second electronic device by using the first electronic device is to perform projection, that is, project a video being played on the first electronic device to the second electronic device for playing; and send video data to the second electronic device through the wireless connection, where the video data is data of the video being played on the first electronic device. The second electronic device is configured to receive the video data through the wireless connection, and play the video data.

According to the foregoing technical solution, after the user touches the NFC tag on the second electronic device by using the first electronic device, the first electronic device can establish a wireless connection to the second electronic device, and when the first electronic device determines that the intention of the user to touch the NFC tag on the second electronic device by using the first electronic device is to perform projection, the first electronic device can further synchronize the data of the video being played on the first electronic device with the second electronic device, so that the second electronic device synchronously plays the video being played on the first electronic device. That is, after the user touches an NFC tag on another electronic device by using an electronic device having the NFC function, a plurality of functions can be implemented simultaneously. In this way, a plurality of functions can be implemented simultaneously through one touch of the user, thereby improving interaction efficiency.

In a possible implementation, that the first electronic device is configured to send video data to the second electronic device through the wireless connection includes: The first electronic device is configured to send the video data to the second electronic device through the wireless connection by using a wireless projection (miracast) technology or a digital living network alliance (DLNA) technology.

In another possible implementation, the current scenario information may include at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

According to a third aspect, an embodiment of this application provides a first electronic device. The first electronic device has an NFC function, and the first electronic device may include a processor, a memory, and a wireless communications module. The processor, the wireless communications module, and the memory are coupled. The memory is configured to store computer program code, and the computer program code includes computer instructions. When the computer instructions are executed by the first electronic device, the first electronic device performs the following operations: when a user touches an NFC tag of a second electronic device by using the first electronic device, reading connection information stored in the NFC tag, and establishing a first wireless connection to the second electronic device based on the connection information; and determining that the first electronic device establishes a second wireless connection to a third electronic device, sending first audio channel data to the second electronic device through the first wireless connection, and sending second audio channel data to the third electronic device through the second wireless connection, where the first audio channel data and the second audio channel data are two pieces of audio channel data included in audio being played on the first electronic device, so that the second electronic device and the third electronic device implement stereo audio output.

In a possible implementation, when the computer instructions are executed by the first electronic device, the first electronic device is enabled to further perform the following operations: obtaining current scenario information, and determining, based on the current scenario information, that an intention of the user to touch the NFC tag of the second electronic device by using the first electronic device is to synchronize the audio being played on the first electronic device with the second electronic device for playing.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

In another possible implementation, both the second electronic device and the third electronic device are sound boxes; or both the first wireless connection and the second wireless connection are Bluetooth connections.

According to a fourth aspect, an embodiment of this application provides a first electronic device. The first electronic device has an NFC function. The first electronic device may include a processor, a memory, and a wireless communications module. The processor, the wireless communications module, and the memory are coupled. The memory is configured to store computer program code, and the computer program code includes computer instructions. When the computer instructions are executed by the first electronic device, the first electronic device performs the following operations: when a user touches an NFC tag of a second electronic device by using the first electronic device, reading connection information stored in the NFC tag, and establishing a wireless connection to the second electronic device based on the connection information; and obtaining current scenario information, determining, based on the current scenario information, that an intention of the user to touch the NFC tag of the second electronic device by using the first electronic device is to project a video being played on the first electronic device to the second electronic device for playing, and sending video data to the second electronic device through the wireless connection, where the video data is data of the video being played on the first electronic device.

In a possible implementation, the sending video data to the second electronic device through the wireless connection may include: sending the video data to the second electronic device through the wireless connection by using a miracast technology or a DLNA technology.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

According to a fifth aspect, an embodiment of this application provides a chip system. The chip system is applied to a first electronic device having an NFC function. The chip system may include one or more interface circuits and one or more processors. The interface circuit and the processor are interconnected through a line; the interface circuit is configured to receive a signal from a memory of the first electronic device, and send the signal to the processor, and the signal includes computer instructions stored in the memory. When the processor executes the computer instructions, the first electronic device performs the following operations: when a user touches an NFC tag of a second electronic device by using the first electronic device, reading connection information stored in the NFC tag, and establishing a first wireless connection to the second electronic device based on the connection information; and determining that the first electronic device establishes a second wireless connection to a third electronic device, sending first audio channel data to the second electronic device through the first wireless connection, and sending second audio channel data to the third electronic device through the second wireless connection, where the first audio channel data and the second audio channel data are two pieces of audio channel data included in audio being played on the first electronic device, so that the second electronic device and the third electronic device implement stereo audio output.

In a possible implementation, when the processor executes the computer instructions, the first electronic device further performs the following operations: obtaining current scenario information, and determining, based on the current scenario information, that an intention of the user to touch the NFC tag of the second electronic device by using the first electronic device is to synchronize the audio being played on the first electronic device with the second electronic device for playing.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

In another possible implementation, both the second electronic device and the third electronic device are sound boxes; or both the first wireless connection and the second wireless connection are Bluetooth connections.

According to a sixth aspect, an embodiment of this application provides a chip system. The chip system is applied to a first electronic device having an NFC function. The chip system includes one or more interface circuits and one or more processors. The interface circuit and the processor are interconnected through a line; the interface circuit is configured to receive a signal from a memory of the first electronic device, and send the signal to the processor, and the signal includes computer instructions stored in the memory. When the processor executes the computer instructions, the first electronic device performs the following operations: when a user touches an NFC tag of a second electronic device by using the first electronic device, reading connection information stored in the NFC tag, and establishing a wireless connection to the second electronic device based on the connection information; and obtaining current scenario information, determining, based on the current scenario information, that an intention of the user to touch the NFC tag of the second electronic device by using the first electronic device is to project a video being played on the first electronic device to the second electronic device for playing, and sending video data to the second electronic device through the wireless connection, where the video data is data of the video being played on the first electronic device.

In a possible implementation, the sending video data to the second electronic device through the wireless connection includes: sending the video data to the second electronic device through the wireless connection by using a miracast technology or a DLNA technology.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

According to a seventh aspect, an embodiment of this application provides a method for implementing functions by using an NFC tag. The method may be applied to a first electronic device having an NFC function. The method may include: When a user touches an NFC tag of a second electronic device by using the first electronic device, the first electronic device reads connection information stored in the NFC tag, and establishes a first wireless connection to the second electronic device based on the read connection information; the first electronic device determines that the first electronic device establishes a second wireless connection to a third electronic device, sends first audio channel data to the second electronic device through the first wireless connection, and sends second audio channel data to the third electronic device through the second wireless connection, where the first audio channel data and the second audio channel data are two pieces of audio channel data included in audio being played on the first electronic device, so that the second electronic device and the third electronic device implement stereo audio output.

In a possible implementation, the method may further include: The first electronic device obtains current scenario information, and determines, based on the current scenario information, that an intention of the user to touch the NFC tag of the second electronic device by using the first electronic device is to synchronize the audio being played on the first electronic device with the second electronic device for playing.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/of state, where the communication status includes a type of a current wireless connection; and the application status of the first electronic device includes at least one of the following: a foreground running status of an application, or a list of applications whose functions can be automatically implemented by reading information about the NFC tag.

In another possible implementation, both the second electronic device and the third electronic device are sound boxes; or both the first wireless connection and the second wireless connection are Bluetooth connections.

According to an eighth aspect, an embodiment of this application provides a method for implementing functions by using an NFC tag. The method may be applied to a first electronic device having an NFC function. The method may include: When a user touches an NFC tag of a second electronic device by using the first electronic device, the first electronic device reads connection information stored in the NFC tag, and establishes a wireless connection to the second electronic device based on the read connection information; the first electronic device obtains current scenario information, and determines, based on the current scenario information, that an intention of the user to touch the NFC tag of the second electronic device by using the first electronic device is to project a video being played on the first electronic device to the second electronic device for playing; and the first electronic device sends video data to the second electronic device through the wireless connection, where the video data is data of the video being played on the first electronic device.

In a possible implementation, that the first electronic device sends video data to the second electronic device through the wireless connection may include: The first electronic device sends the video data to the second electronic device through the wireless connection by using a miracast technology or a DLNA technology.

In another possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

According to a ninth aspect, an embodiment of this application provides a method for implementing functions by using an NFC tag. The method may be applied to a first electronic device having an NFC function. The method may include: When a user touches an NFC tag of a second electronic device by using the first electronic device, the first electronic device reads connection information stored in the NFC tag, and establishes a wireless connection to the second electronic device based on the read connection information; the first electronic device obtains current scenario information, and determines, based on the current scenario information, that an intention of the user to touch the NFC tag of the second electronic device by using the first electronic device is to synchronize audio being played on the first electronic device with the second electronic device for playing; the first electronic device determines, based on the current scenario information, whether a current playlist needs to change (the current playlist is a play list to which the audio being played on the first electronic device belongs); and if determining that the current playlist does not need to change, the first electronic device sends first audio data to the second electronic device through the wireless connection, where the first audio data is data of the audio being played on the first electronic device; or if determining that the current play list needs to change, the first electronic device changes the current playlist, and sends second audio data to the second electronic device through the wireless connection, where the second audio data is data of audio in a playlist obtained after changing.

In a possible implementation, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

According to a tenth aspect, an embodiment of this application provides a computer storage medium. The computer storage medium includes computer instructions. When the computer instructions are run on an electronic device, the electronic device is enabled to perform the method for implementing functions by using an NFC tag according to any one of the seventh aspect and the possible implementations of the seventh aspect, or the eighth aspect and the possible implementations of the eighth aspect, or the ninth aspect and the possible implementations of the ninth aspect.

According to an eleventh aspect, an embodiment of this application provides a computer program product. When the computer program product is run on a computer, the computer is enabled to perform the method for implementing functions by using an NFC tag according to any one of the seventh aspect and the possible implementations of the seventh aspect, or the eighth aspect and the possible implementations of the eighth aspect, or the ninth aspect and the possible implementations of the ninth aspect.

According to a twelfth aspect, an embodiment of this application provides an apparatus. The apparatus has a function of implementing behavior of a first electronic device in the method according to the seventh aspect, the eighth aspect, or the ninth aspect. The function may be implemented by hardware, or may be implemented by hardware executing corresponding software. The hardware or the software includes one or more modules corresponding to the foregoing function, for example, an NFC unit or module, an intelligent unit or module, and a connection unit or module.

It should be understood that descriptions of technical features, technical solutions, beneficial effects, or similar statements in this application do not imply that all features and advantages can be implemented in any single embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In other embodiments, additional technical features and beneficial effects may further be identified in a specific embodiment that does not reflect all the embodiments.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more than two.

Figure 1A:
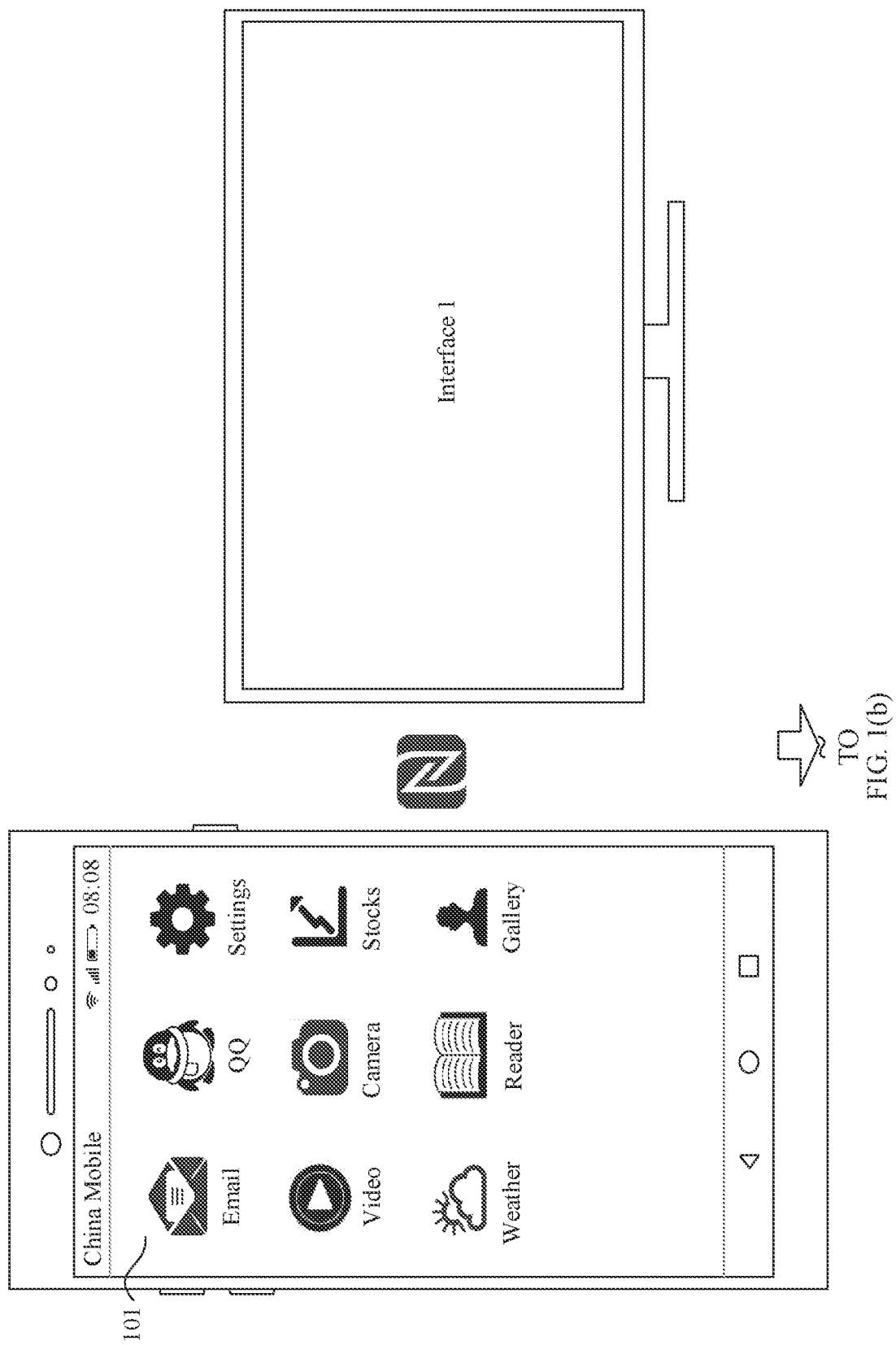
FIG. 1(a) and FIG. 1(b) are a schematic diagram of a scenario in which a function is implemented by using an NFC tag according to the conventional technology.
Figure 1B:
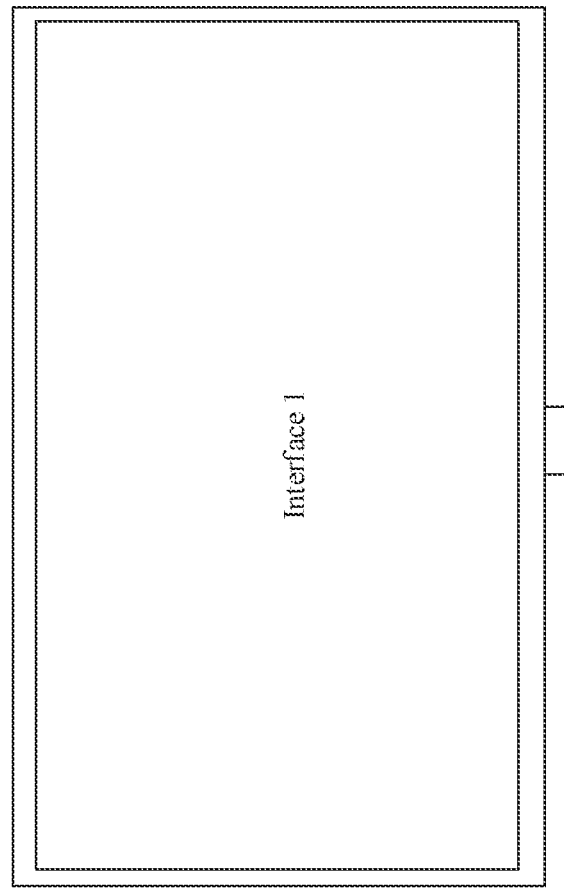
Figure 1B:
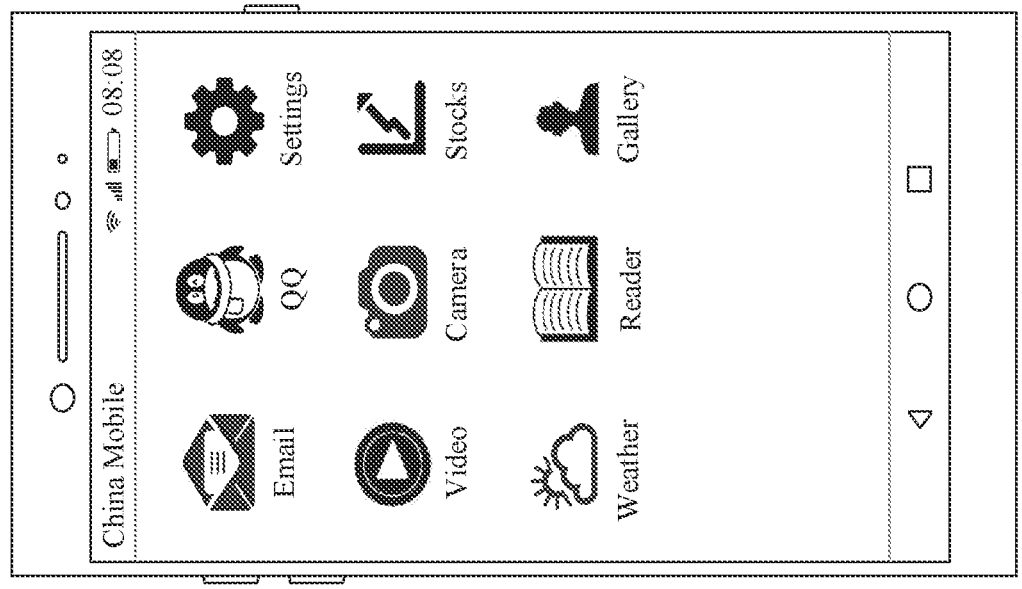
Figure 2A:
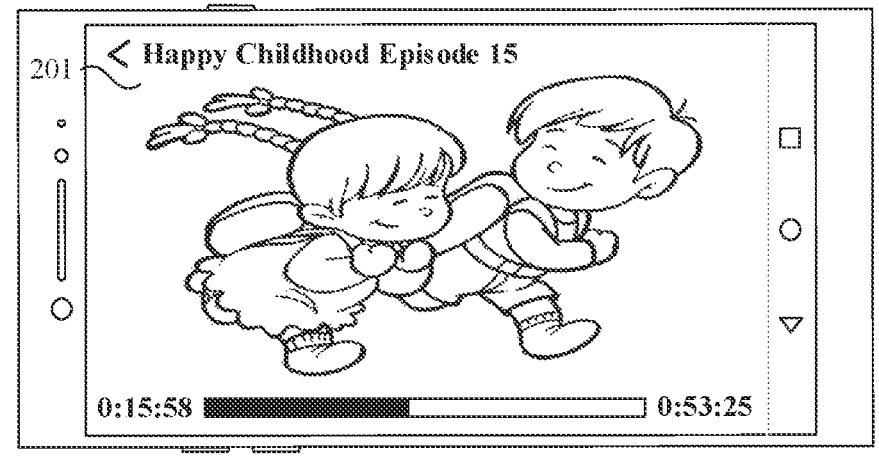
FIG. 2(a) and FIG. 2(b) are a schematic diagram of another scenario in which a function is implemented by using an NFC tag according to the conventional technology.
Figure 2A:
Figure 2A:
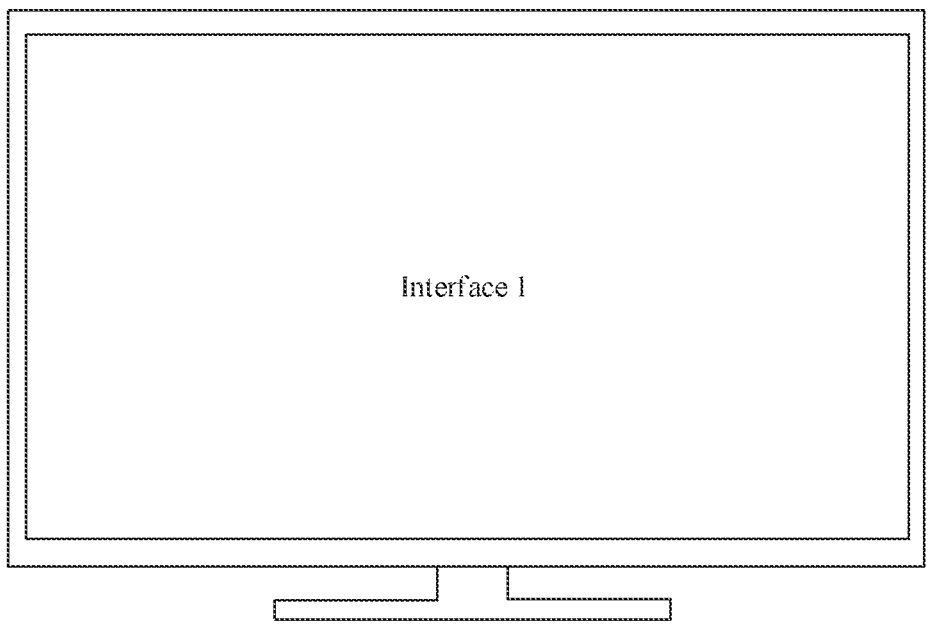
Figure 2B:
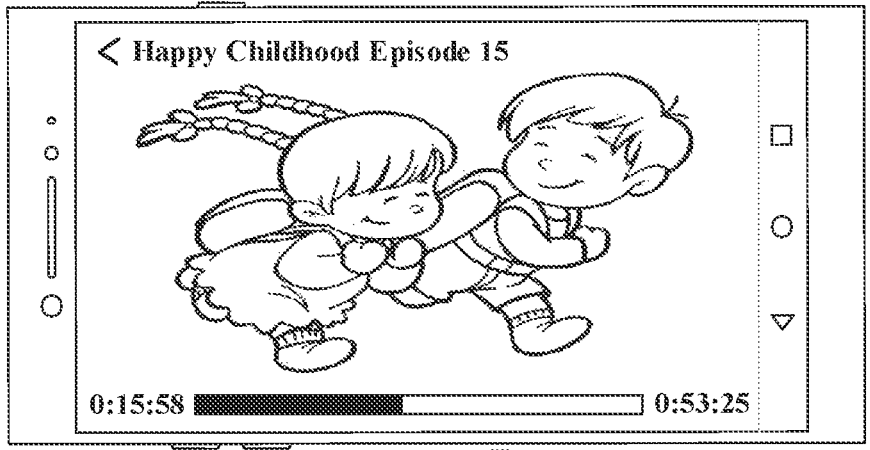
Figure 2B:
Figure 2B:
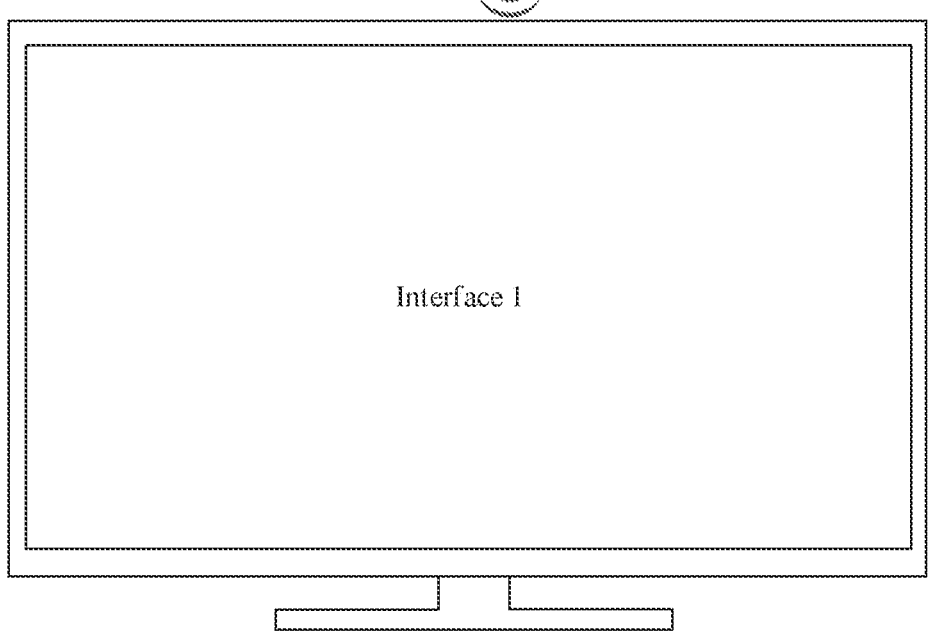

Currently, an electronic device (such as a mobile phone) having an NFC function can implement only one function by reading an NFC tag on another device. For example, an NFC tag on a television stores connection information used to establish a wireless connection to the television. After a user touches the NFC tag on the television by using the mobile phone having the NFC function, the NFC tag on the television is activated, and in this case, the mobile phone can read the connection information in the NFC tag. After the corresponding information is read, no matter what function is currently performed by the mobile phone, for example, a home screen 101 shown in FIG. 1(a) is currently displayed, or as shown in FIG. 2(a), a video 201 is playing, the mobile phone can only establish a wireless connection to the television based on the read connection information, as shown in FIG. 1(b) and FIG. 2(b) (in the figures, an example in which the mobile phone establishes a Bluetooth connection to the television is used). Usually, the user wants to not only establish the wireless connection to the television, but also implement other functions, such as using the mobile phone to simulate a remote control or synchronously playing a video on the television. In this case, the user can implement corresponding functions only by performing other related operations, resulting in low interaction efficiency.

An embodiment of this application provides a method for implementing functions by using an NFC tag. After a user touches an NFC tag on another electronic device by using an electronic device (such as a mobile phone) having an NFC function, a plurality of functions can be implemented simultaneously. For example, after the user holds the mobile phone having the NFC function to touch an NFC tag on a television, the mobile phone may not only establish a wireless connection to the television, but also display a remote control interface, so that the mobile phone simulates a remote control of the television. For another example, the user is watching a video by using the mobile phone having the NFC function; and after the user holds the mobile phone to touch an NFC tag on a television, the mobile phone may not only establish a wireless connection to the television, but also synchronize the video being played on the mobile phone with the television for playing. In this way, a plurality of functions can be implemented simultaneously through one touch of the user, thereby improving interaction efficiency.

The following describes an implementation of this embodiment of this application in detail with reference to the accompanying drawings.

Figure 3:
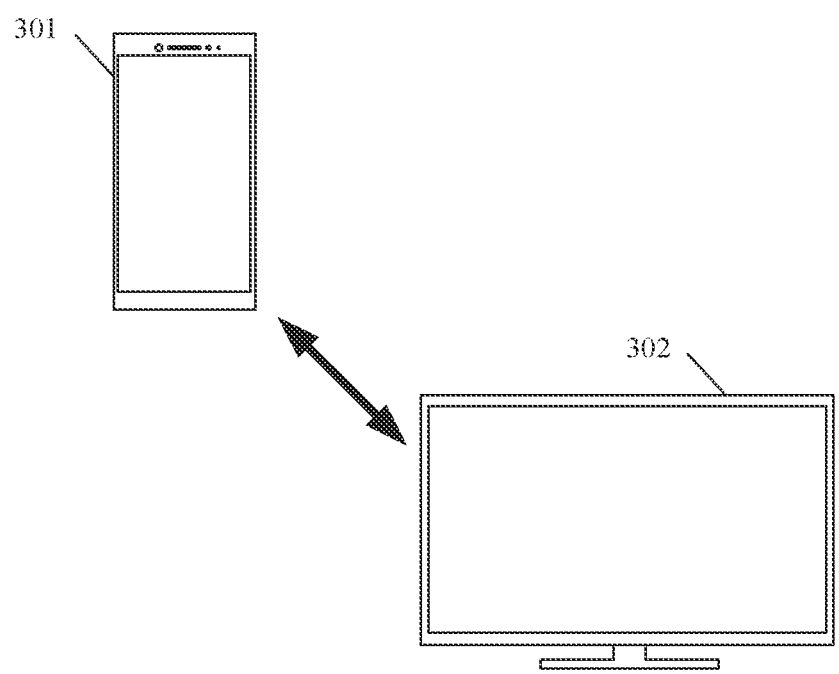
FIG. 3 is a schematic diagram of composition of a system architecture according to an embodiment of this application.

FIG. 3 is a schematic diagram of a system architecture to which the foregoing method is applicable according to an embodiment. The system architecture may include at least two electronic devices such as a first electronic device 301 and a second electronic device 302.

The first electronic device 301 has an NFC function. For example, an NFC chip may be installed in the first electronic device 301, so that the first electronic device 301 implements the NFC function. In some embodiments, the first electronic device 301 having the NFC function may work in three working modes: a reader/writer mode, a card emulation mode, and a peer-to-peer mode.

The second electronic device 302 has an NFC tag, and the NFC tag may store information, such as connection information used by another electronic device to establish a wireless connection to the second electronic device 302. The connection information may be an identifier (for example, a media access control (media access control, MAC) address) of the second electronic device 302.

In some embodiments, when the first electronic device 301 works in the reader/writer mode, the first electronic device 301 may be used as an NFC tag reading end to read an NFC tag end such as the NFC tag disposed on the second electronic device 302. For example, in this embodiment of this application, when the first electronic device 301 works in the reader/writer mode, the user may use the first electronic device 301 to touch the NFC tag on the second electronic device 302, to provide power for the NFC tag, so as to activate the NFC tag. In this case, the first electronic device 301 may read the information stored in the NFC tag on the second electronic device 302, for example, the foregoing connection information. Based on the connection information, the first electronic device 301 may establish the wireless connection to the second electronic device 302. In addition, based on the established wireless connection, another function may be automatically implemented between the first electronic device 301 and the second electronic device 302. That is, a plurality of functions are implemented simultaneously through one touch of the user.

It should be noted that, in this embodiment of this application, the wireless connection may be a connection established between the first electronic device 301 and the second electronic device 302 by using a wireless communications protocol. The wireless communications protocol may be a wireless fidelity (wireless fidelity, Wi-Fi) protocol, a Bluetooth (Bluetooth) protocol, a ZigBee protocol, a cellular network protocol, or the like. This is not specifically limited herein in this embodiment.

For example, an electronic device (for example, the first electronic device 301 or the second electronic device 302) in this embodiment of this application may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, a wearable device (for example, a smart watch), a media player, an Internet of things (Internet of Things, IoT) device, or the like. A specific form of the device is not particularly limited in this embodiment of this application. The IoT device may be a television, a sound box, a router, or the like. A specific structure of the electronic device may be shown in FIG. 4, and is specifically described in the following embodiment.

In some embodiments, the first electronic device 301 and the second electronic device 302 may be a same type of electronic devices. For example, both the first electronic device 301 and the second electronic device 302 are mobile phones. In some other embodiments, the first electronic device 301 and the second electronic device 302 may be different types of electronic devices. For example, the first electronic device 301 is a mobile phone, and the second electronic device 302 is a notebook computer, a television, or a sound box. This is not specifically limited in this embodiment. For example, in FIG. 3, the first electronic device 301 is a mobile phone and the second electronic device 302 is a television.

Figure 4:
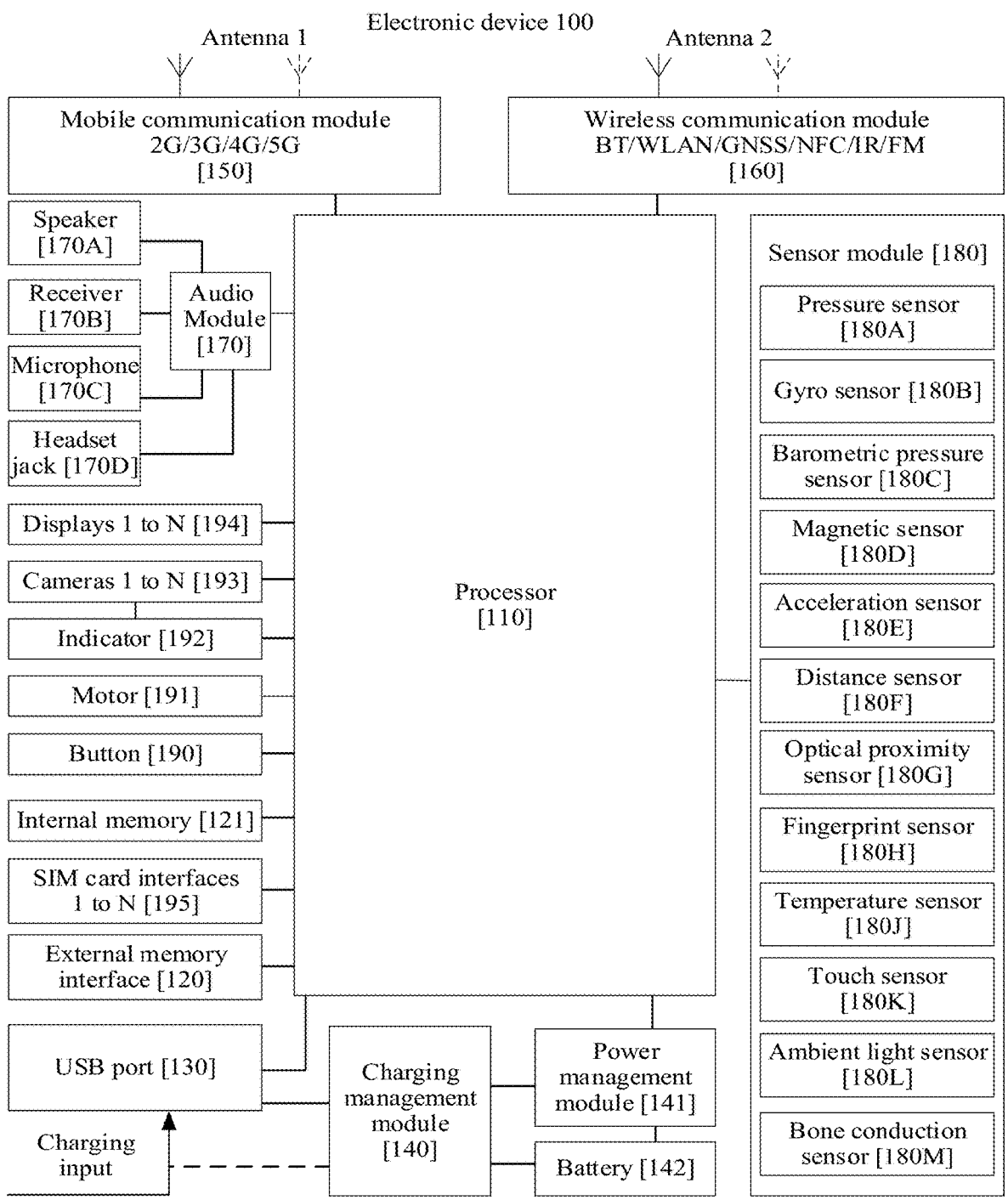
FIG. 4 is a schematic diagram of a structure of an electronic device according to an embodiment of this application.

FIG. 4 is a schematic diagram of a structure of an electronic device according to an embodiment of this application. As shown in FIG. 4, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment does not constitute a specific limitation on the electronic device. In other embodiments, the electronic device may include more or fewer components than those shown in the figure, or some components are combined, or some components are split, or component arrangements are different. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be standalone devices, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, an SIM interface, a USB port, and/or the like.

The charging management module 140 is configured to receive charging input from the charger. The charger may be a wireless charger or a wired charger. In some embodiments in which wired charging is used, the charging management module 140 may receive charging input from the wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142 and the charging management module 140 to the processor 110. The power management module 141 receives input of the battery 142 and/or charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions, applied to the electronic device, for example, a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the wireless communications module 160 may include an NFC chip. The NFC chip can perform processing such as amplification, analog-to-digital conversion, digital-to-analog conversion, and storage on a signal, and may be responsible for data transmission through an antenna (for example, the antenna 2).

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device may include one or N displays 194, where N is a positive integer greater than 1.

The electronic device may implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device can play or record videos in a plurality of encoding formats, for example, moving picture experts group (moving picture experts group, MPEG-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU may be used to implement an application such as intelligent cognition of the electronic device, for example, image recognition, facial recognition, voice recognition, and text understanding.

The external memory interface 120 may be configured to connect to an external memory card, for example, a micro SD card, to extend a storage capability of the electronic device. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the electronic device. In addition, the internal memory 121 may include a high-speed random access memory, and may further include a nonvolatile memory, for example, at least one magnetic disk storage device, a flash memory device, or a universal flash storage (universal flash storage, UFS).

The electronic device may implement an audio function by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call, sending voice information, or needing to trigger, by using a voice assistant, the electronic device to perform some functions, a user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, is addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be a USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device. In some embodiments, the gyro sensor 180B may be used to determine angular velocities of the electronic device around three axes (namely, axes x, y, and z). The gyro sensor 180B may be configured to perform image stabilization during photographing. For example, when a shutter is pressed, the gyro sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device calculates an altitude by using the atmospheric pressure measured by the barometric pressure sensor 180C, to assist in positioning and navigation.

The magnetic sensor 180D includes a Hall effect sensor. The electronic device may detect opening and closing of a flip holster by using the magnetic sensor 180D. In some embodiments, when the electronic device is a clamshell phone, the electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device, and may detect magnitude and a direction of gravity when the electronic device is stationary. The acceleration sensor 180E may be further configured to identify a posture of the electronic device, and is used in an application such as switching between landscape mode and portrait mode or a pedometer.

The distance sensor 180E is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user puts the electronic device close to an ear for making a call, so that automatic screen-off is implemented to achieve power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed brightness of the ambient light. The ambient light sensor 180L may also be configured to automatically adjust white balance during photographing. The ambient light sensor 180L may further cooperate with the optical proximity sensor 180G to detect whether the electronic device is in a pocket, so as to avoid an unintentional touch.

The fingerprint sensor 180H is configured to collect a fingerprint. The electronic device may implement fingerprint unlocking, access application locking, fingerprint photographing, fingerprint answering of a call, and the like by using a feature of the captured fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may be alternatively disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive key input, and generate key signal input related to user settings and function control of the electronic device.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device. The electronic device may support one SIM card interface or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 is also applicable to an external storage card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

For example, all technical solutions in the following embodiments may be implemented in an electronic device having the foregoing hardware architecture.

In the embodiments of this application, a user may use an electronic device (for example, the foregoing first electronic device) having an NFC function to touch an NFC tag on another electronic device (for example, the foregoing second electronic device). Through this touch, a plurality of functions can be implemented simultaneously. For example, the NFC tag of the second electronic device stores connection information used by another device to establish a wireless connection to the second electronic device. After the user touches the NFC tag on the second electronic device by using the first electronic device, the first electronic device establishes a wireless connection to the second electronic device, and in addition, an intention of the user to touch the NFC tag by using the first electronic device may be determined with reference to current scenario information. According to the determined intention, another function may be further automatically implemented between the first electronic device and the second electronic device.

In some embodiments of this application, the first electronic device may determine, with reference to the current scenario information, the intention of the user to touch the NFC tag by using the first electronic device.

For example, the first electronic device is a mobile phone, and the second electronic device is an IoT device. The current scenario information may include at least one of the following information: environment information, a current status of the mobile phone, an application status of the mobile phone, or the like. The environment information may include at least one of the following: a time, a geographical location, an ambient temperature, a temperature of the mobile phone, or the like. The current status of the mobile phone may include at least one of the following: whether to play audio, a communication status, a screen-on/off state, or the like. The communication status may include a type of a current wireless connection, for example, a Bluetooth connection, a Wi-Fi connection, or a cellular connection. The application status of the mobile phone may include at least one of the following: a foreground running status of an application, a list of applications whose functions can be automatically implemented by reading information about the NFC tag, or the like.

In some embodiments, an example in which the IoT device is a television is used. The television has an NFC tag. The NFC tag stores connection information used by another device to establish a wireless connection to the television. For example, the connection information is a MAC address of the television. After the user holds the mobile phone to touch the NFC tag on the television, power may be provided for the NFC tag, to activate the NFC tag. In this case, the mobile phone may read the MAC address that is of the television and that is stored in the NFC tag. The mobile phone may establish a wireless connection to the television based on the MAC address. In addition, the mobile phone may determine, with reference to the current scenario information, an intention of the user to touch the NFC tag by using the mobile phone, to automatically implement another function with the television according to the determined intention.

For example, the mobile phone establishes a Bluetooth connection to the television. When the user wants to use the mobile phone to simulate a remote control of the television, the user may hold the mobile phone to touch the NFC tag on the television. When the mobile phone works in a reader/writer mode, after the mobile phone touches the NFC tag on the television, the NFC tag is activated by using the power provided by the mobile phone. In this case, the mobile phone may read the MAC address that is of the television and that is stored in the NFC tag. The mobile phone may send a page request (Page request) to the television based on the MAC address. After receiving the page request, the television returns a page response (Page response) to the mobile phone. Therefore, a Bluetooth connection can be established between the mobile phone and the television.

In addition, the mobile phone may obtain the current scenario information, and determine, based on the obtained scenario information, the intention of the user to touch the NFC tag by using the mobile phone, to automatically implement the another function with the television according to the determined intention.

Figure 5A:
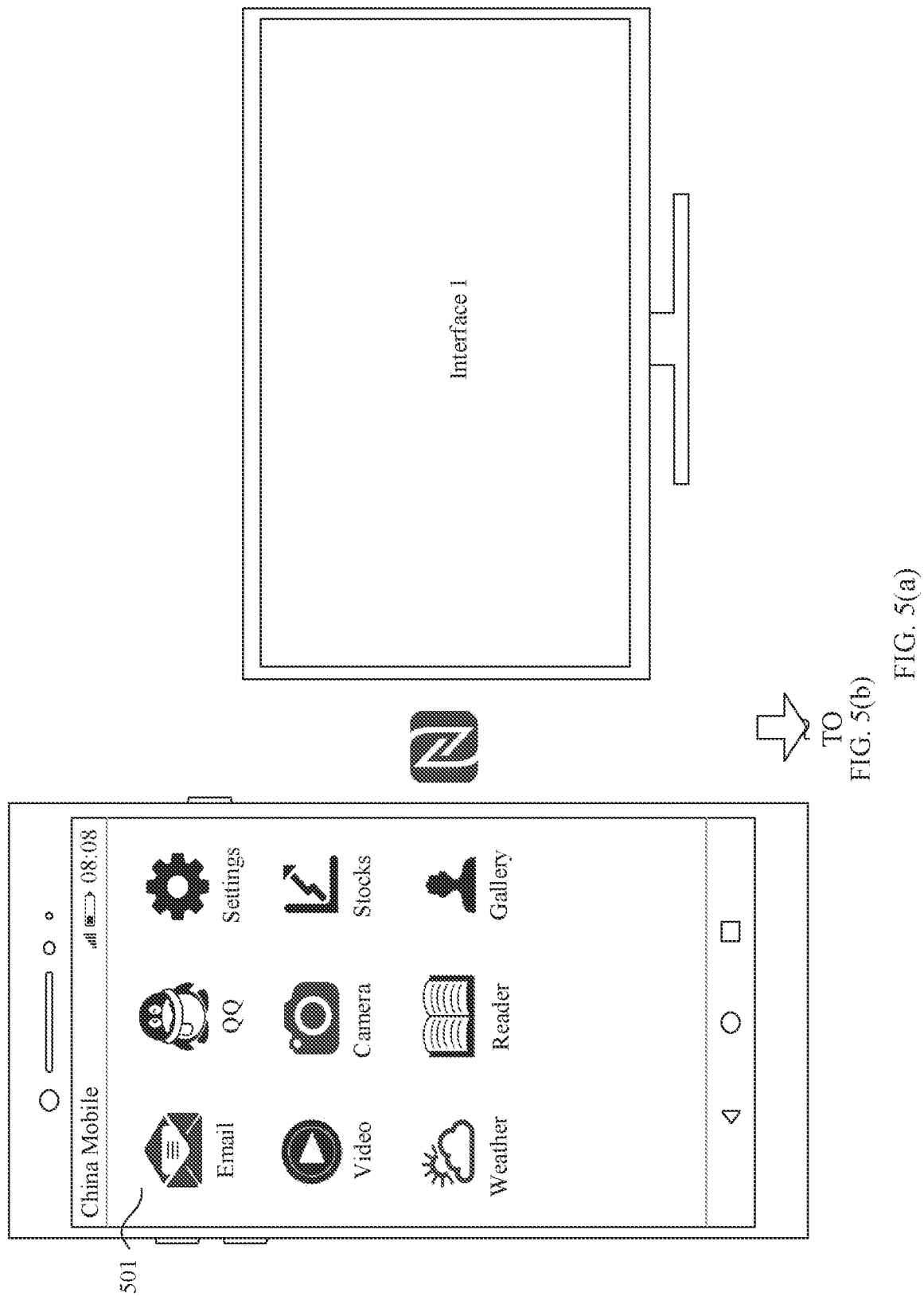
FIG. 5(a) and FIG. 5(b) are a schematic diagram of a scenario in which a function is implemented by using an NFC tag according to an embodiment of this application.
Figure 5B:
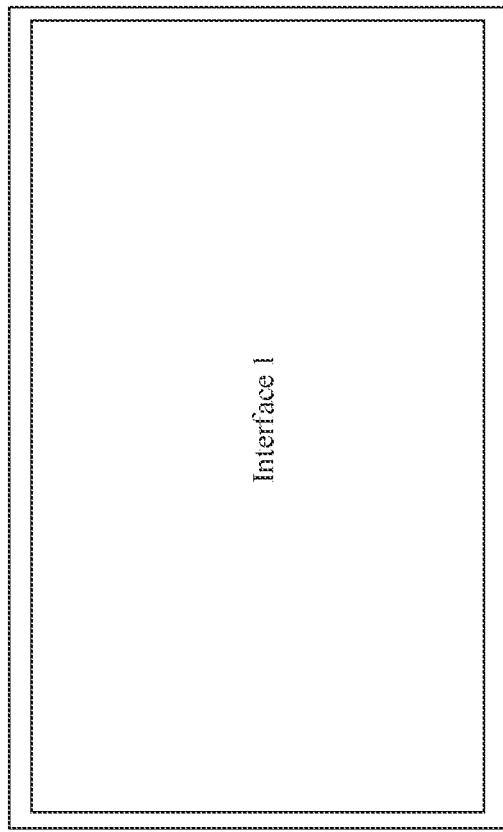

For example, the mobile phone may obtain an application status of the mobile phone. For example, the application status obtained by the mobile phone is: No application is running in the foreground. That is, as shown in FIG. 5(a), the mobile phone currently displays a home screen 501, and no application is running in the foreground. The mobile phone may determine, based on the obtained application status of the mobile phone "no application is running in the foreground", that an intention of the user to touch the NFC tag by using the mobile phone is to simulate a remote control of the television. In this case, the mobile phone may invoke a remote control application in the mobile phone according to the determined intention, and display a remote control interface 502 of the television, as shown in FIG. 5(b).

For another example, the mobile phone may obtain a current status of the mobile phone. For example, the current status of the mobile phone obtained by the mobile phone is: The mobile phone is currently in a screen-on state, and no audio is playing. The mobile phone may determine, based on the obtained current status of the mobile phone "the mobile phone is currently in a screen-on state, and no audio is playing", an intention of the user to touch the NFC tag by using the mobile phone is to simulate a remote control of the television. In this case, the mobile phone may invoke a remote control application in the mobile phone according to the determined intention, and display a remote control interface 502 of the television, as shown in FIG. 5(b).

Then, when the user performs an operation on the remote control interface 502 displayed on the mobile phone, the mobile phone transmits, to the television through the established Bluetooth connection, a control instruction corresponding to the operation, so as to implement remote control on the television, that is, implement a function of the mobile phone simulating the remote control of the television.

It can be seen that, after the user touches the NFC tag on the television by using the mobile phone, the mobile phone may not only establish the wireless connection to the television, but also automatically display the remote control interface, so that the mobile phone implements simulation of the remote control of the television.

For another example, the mobile phone establishes a Wi-Fi connection to the television. The user is watching a video on the mobile phone. When the user wants to project (or mirror) the video being played on the mobile phone to the television for playing, the user may hold the mobile phone to touch the NFC tag on the television. When the mobile phone works in a reader/writer mode, after the mobile phone touches the NFC tag on the television, the NFC tag is activated by using the power provided by the mobile phone. In this case, the mobile phone may read the MAC address that is of the television and that is stored in the NFC tag. For example, as shown in S601 in FIG. 6A, an NFC service (service) module of the mobile phone may read the MAC address that is of the television and that is stored in the NFC tag of the television. The mobile phone may establish a Wi-Fi connection to the television based on the MAC address.

In some embodiments, that the mobile phone establishes a Wi-Fi connection to the television may be that the mobile phone and the television access a same Wi-Fi access point. For example, the mobile phone sends, to the television based on the MAC address, information about a Wi-Fi access point (for example, a name and a password of the Wi-Fi access point) to which the mobile phone is connected. After receiving the information, the television uses the information to access the Wi-Fi access point. Therefore, a Wi-Fi connection can be established between the mobile phone and the television. In some other embodiments, that a Wi-Fi connection is established between the mobile phone and the television may be that a Wi-Fi direct connection (direct connection) is established between the mobile phone and the television. For example, the mobile phone establishes a direct Wi-Fi connection to the television based on the MAC address. For example, as shown in S602 in FIG. 6A, a Wi-Fi module of the mobile phone may send a peer-to-peer (Peer-to-Peer, P2P) connection request to a Wi-Fi module of the television based on the MAC address. After receiving the P2P connection request, the Wi-Fi module of the television may return a connection response to the Wi-Fi module of the mobile phone, where the connection response is used to indicate that the television accepts the connection request of the mobile phone. Therefore, a Wi-Fi connection may be established between the Wi-Fi module of the mobile phone and the Wi-Fi module of the television.

In addition, the mobile phone may obtain the current scenario information, and determine, based on the obtained scenario information, the intention of the user to touch the NFC tag by using the mobile phone, to automatically implement the another function with the television according to the determined intention.

For example, the mobile phone may obtain an application status of the mobile phone. For example, the application status obtained by the mobile phone is: A video application is running in the foreground. That is, as shown in FIG. 6B(a), the mobile phone currently displays a video application interface 601, and a video is playing. In addition, as shown in FIG. 6B(a), the television currently displays an interface 1. The mobile phone may determine, based on the obtained application status of the mobile phone "a video application is running in the foreground", that an intention of the user to touch the NFC tag by using the mobile phone is to project the video on the mobile phone to the television. The mobile phone may project the video played on the mobile phone to the television according to the determined intention. For example, the mobile phone may use a wireless projection (miracast) technology or a digital living network alliance (digital living network alliance, DLNA) technology to project, through the Wi-Fi connection established between the mobile phone and the television, the video played on the mobile phone to the television for playing. As shown in 602 in FIG. 6B(b), the television synchronously plays the video played on the mobile phone. For example, as shown in S603 in FIG. 6A, an NFC service module of the mobile phone may call back the video application in the mobile phone, to transmit a video that needs to be transmitted, namely, a video that is playing, to the Wi-Fi module of the mobile phone. In this way, as shown in S604 in FIG. 6A, the Wi-Fi module of the mobile phone may perform miracast projection, that is, transmit the video that needs to be transmitted to the Wi-Fi module of the television through the established Wi-Fi connection by using the miracast technology, so that the television synchronously plays the video played on the mobile phone. It should be noted that, an execution sequence of a process in which the mobile phone determines an intention of the user to touch the NFC tag by using the mobile phone and obtains data (for example, the foregoing video) that needs to be transmitted, and a process in which the mobile phone establishes a wireless connection to the television is not specifically limited in this embodiment. For example, an execution sequence of S602 and S603 is not limited in this embodiment. In some embodiments, S602 may be performed first, and then S603 is performed. In some other embodiments, S603 may be performed first, and then S602 is performed.

For another example, the mobile phone determines, based on the obtained application status of the mobile phone, that an intention of the user to touch the NFC tag by using the mobile phone is to project the video played on the mobile phone to the television. However, the intention determined only based on the application status of the mobile phone may be inaccurate. Therefore, the mobile phone may confirm accuracy of the determined intention with reference to other scenario information. For example, usually projection needs to transmit a large amount of data, and therefore, it is recommended that a Wi-Fi connection may be used for data transmission. If a Bluetooth connection or another connection is used for data transmission, projection effect may be poor. Therefore, after determining that the intention of the user to touch the NFC tag by using the mobile phone is to project the video played on the mobile phone to the television, the mobile phone may continue to obtain a current status of the Mobile phone, to determine a type of a wireless connection between the mobile phone and the television. If the type of the current wireless connection that is obtained by the mobile phone is the Wi-Fi connection, the mobile phone may finally determine that the intention of the user to touch the NFC tag by using the mobile phone is indeed to project the video played on the mobile phone to the television. In this case, the mobile phone may project the video played on the mobile phone to the television through the Wi-Fi connection established between the mobile phone and the television. If the type of the current wireless connection that is obtained by the mobile phone is not the Wi-Fi connection but another type of a wireless connection, the mobile phone may re-obtain current scenario information, and determine, based on the re-obtained scenario information, the intention of the user to touch the NFC tag by using the mobile phone, to automatically implement another function.

It can be seen that, after the user touches the NFC tag on the television by using the mobile phone, the mobile phone may not only establish a wireless connection to the television, but also automatically project the video currently being played on the mobile phone to the television for synchronous playing.

Similarly, when the user is viewing a picture by using the mobile phone, if the user wants to project (or mirror) the picture being viewed on the mobile phone to another device such as a television for viewing, the user may also touch the NFC tag on the television by using the mobile phone, to implement one touch, so that the mobile phone establishes a wireless connection to the television, and project the picture on the mobile phone to the television for simultaneous viewing. For specific implementation, refer to the specific descriptions in the example in which the user is watching the video by using the mobile phone and the video being played is projected to the television for playing. Details are not described herein again.

In some other embodiments, an example in which the IoT device is a sound box is used. The sound box has an NFC tag. The NFC tag stores connection information used by another device to establish a wireless connection to the sound box. For example, the connection information is a MAC address of the sound box. After the user holds the mobile phone to touch the NFC tag on the sound box, power may be provided for the NFC tag, to activate the NFC tag. In this case, the mobile phone may read the MAC address that is of the sound box and that is stored in the NFC tag. The mobile phone may establish a wireless connection to the sound box based on the MAC address. In addition, the mobile phone may determine, with reference to the current scenario information, an intention of the user to touch the NFC tag by using the mobile phone, to automatically implement another function with the sound box according to the determined intention.

Figure 7A:
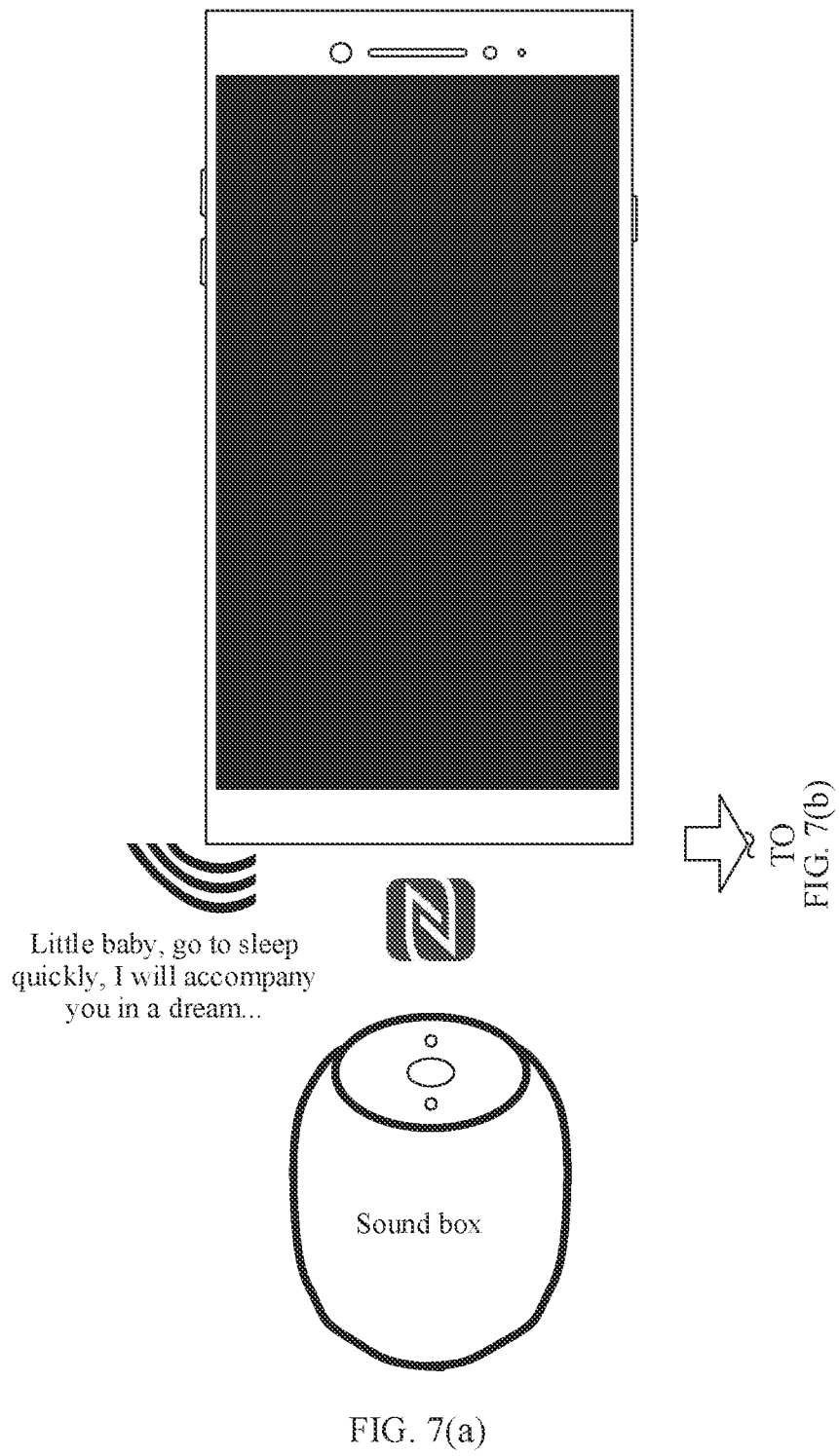
FIG. 7(a) and FIG. 7(b) are a schematic diagram of a still another scenario in which a function is implemented by using an NIT tag according to an embodiment of this application.

For example, the mobile phone establishes a Bluetooth connection to the sound box. As shown in FIG. 7(a) or FIG.

Figure 7B:
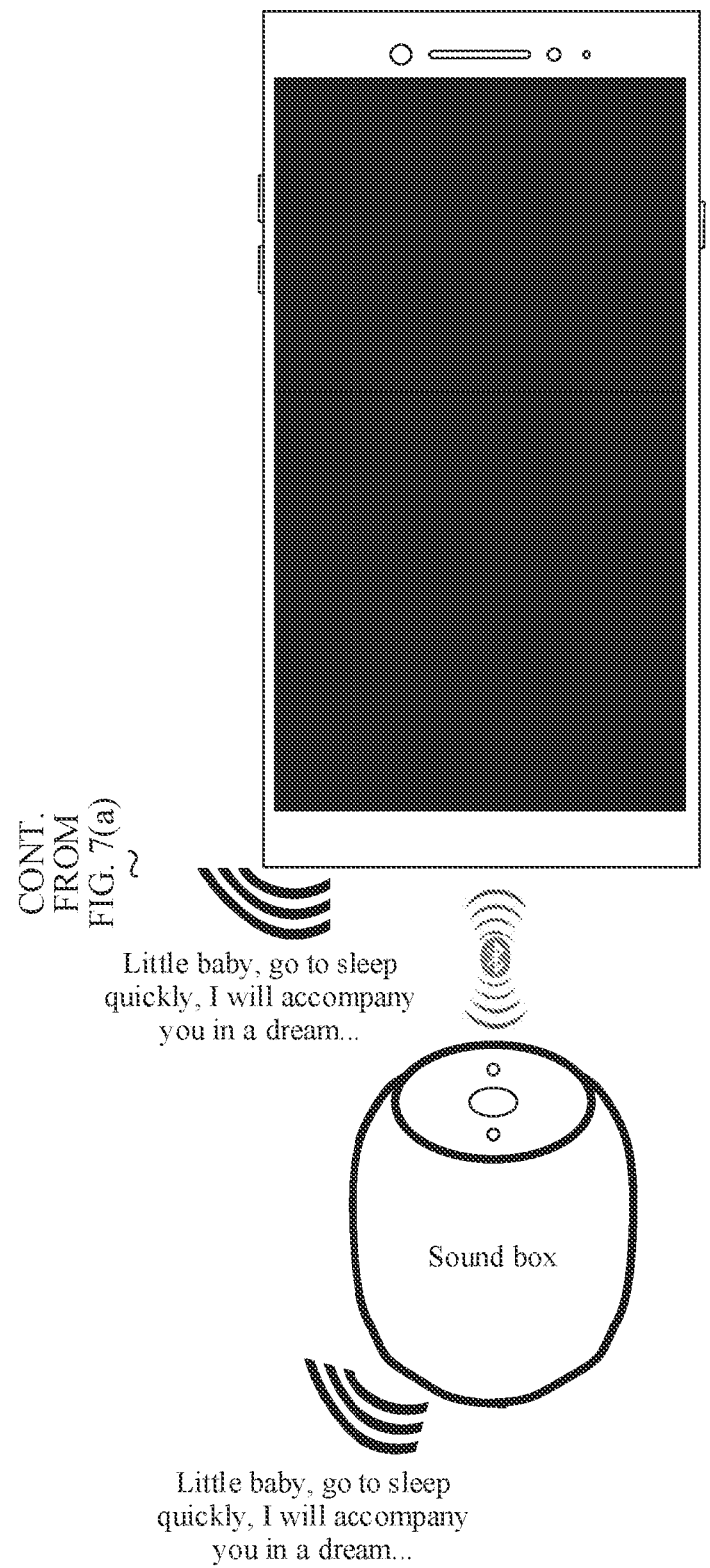

8B(*a*), the user is using the mobile phone to play music "little baby, go to sleep quickly. I will accompany you in a dream . . . ". When the user wants to use the sound box to synchronously play the music on the mobile phone, the user may hold the mobile phone to touch the NFC tag on the sound box. When the mobile phone works in a reader/writer mode, after the mobile phone touches the NFC tag on the sound box, the NFC tag is activated by using the power provided by the mobile phone. In this case, the mobile phone may read the MAC address that is of the sound box and that is stored in the NFC tag. For example, as shown in S801 in FIG. 8A, an NFC service (service) module of the mobile phone may read the MAC address that is of the sound box and that is stored in the NFC tag of the sound box. As shown in S802 in FIG. 8A, a Bluetooth (Bluetooth, BT) module of the mobile phone may send a BT connection request to a BT module of the sound box based on the MAC address. After receiving the BT connection request, the BT module of the sound box may return a connection response to the BT module of the mobile phone, where the connection response is used to indicate that the sound box accepts the connection request of the mobile phone. For example, the BT connection request may be a page request. The connection response may be a page response. Therefore, as shown in FIG. 7(*b*) or FIG. 8B(*b*), a Bluetooth connection may be established between the mobile phone and the sound box.

In addition, the mobile phone may obtain the current scenario information, and determine, based on the obtained scenario information, the intention of the user to touch the NFC tag by using the mobile phone, to automatically implement the another function with the sound box according to the determined intention.

For example, the mobile phone may obtain a current status of the mobile phone. For example, the current status of the mobile phone obtained by the mobile phone is: The mobile phone is playing audio. The mobile phone may determine, based on the obtained current status of the mobile phone "the mobile phone is playing audio", an intention of the user to touch the NFC tag by using the mobile phone is to play music synchronously by using the sound box. In this case, the mobile phone may synchronize, according to the determined intention, music played on the mobile phone with the sound box for playing through a Bluetooth connection established between the mobile phone and the sound box. As shown in FIG. 7(*b*), the sound box synchronously plays music "little baby, go to sleep quickly, I will accompany you in a dream . . . " that is played on the mobile phone.

For another example, after the mobile phone determines, based on the obtained current status of the mobile phone, that an intention of the user to touch the NFC tag by using the mobile phone is to play music synchronously by using the sound box, the mobile phone may further continue to determine, with reference to other scenario information, a type of music that the user wants to play. That is, with reference to other scenario information, it is determined whether to continue to enable the mobile phone and the sound box to synchronously play the music currently played on the mobile phone, in an example, the mobile phone may collect statistics in advance about information such as a time and/or a geographical location at which the user usually uses the sound box to play one or some types of music, so that after the user touches the NFC tag of the sound box by using the mobile phone subsequently, the type of music that the user wants to play may be determined based on the information. In some embodiments, the mobile phone may obtain a current time by reading a system time of the mobile phone. The mobile phone may obtain the geographical location by using various positioning technologies. For example, the mobile phone may obtain a geographical location of the user by using a GPS module in the mobile phone. For example, the mobile phone collects statistics that the user usually plays children's songs in a children's room and play pop music in a living room. In this case, after determining, based on the obtained current status of the mobile phone, that an intention of the user to touch the NFC tag by using the mobile phone is to synchronously play music by using the sound box, the mobile phone may continue to obtain current environment information. For example, the mobile phone obtains a current geographical location of the user. When the mobile phone obtains that the current geographical location of the user is a children's room, if music currently played on the mobile phone is not a children's song such as the music "little baby, go to sleep quickly, I will accompany you in a dream . . . " shown in FIG. 8B(*a*), as shown in FIG. 8B(*b*), the mobile phone may automatically switch a playlist to the children's song, automatically play the children's song in a playlist obtained after switching (for example, "two tigers, two tigers run fast . . . "), and synchronize, through a Bluetooth connection established between the mobile phone and the sound box, the children's song played on the mobile phone with the sound box for playing. As shown in FIG. 8B(*b*), the sound box synchronously plays the music "two tigers, two tigers run fast . . . " in the mobile phone. When the mobile phone obtains that the current geographical location of the user is a living room, and the mobile phone currently plays the pop music, the mobile phone may synchronize, through a Bluetooth connection established between the mobile phone and the sound box, the pop music currently played on the mobile phone with the sound box for playing, and keep a current playlist unchanged. For example, as shown in S803 in FIG. 8A, the NFC service module of the mobile phone may call back the GPS module of the mobile phone to perform location confirmation, that is, obtain a geographical location of the user, so as to determine, based on the obtained geographical location, whether the location of the user is a children's room or a living room. Therefore, Corresponding audio that needs to be transmitted is obtained based on the obtained location, and the audio that needs to be transmitted is transmitted to the BT module of the mobile phone. In this way, as shown in S804 in FIG. 8A, the BT module of the mobile phone may transmit the audio that needs to be transmitted to the BT module of the sound box through the established Bluetooth connection, so that the sound box synchronously plays the audio played on the mobile phone. In addition, similar to the description in the foregoing embodiment, an execution sequence of S802 and S803 is not limited in this embodiment. In some embodiments, S802 may be performed first, and then S803 is performed. In some other embodiments, S803 may be performed first, and then S802 is performed.

For another example, after the mobile phone determines, based on the obtained current status of the mobile phone, that an intention of the user to touch the NFC tag by using the mobile phone is to play music synchronously by using the sound box, the mobile phone may further continue to determine, with reference to other scenario information, whether stereo audio output needs to be implemented by using the sound box, in other words, whether to play stereo. For example, after determining that an intention of the user to touch the NFC tag by using the mobile phone is to play music synchronously by using the sound box, the mobile phone may determine whether the mobile phone also establishes a wireless connection to another sound box currently. If the mobile phone determines that the mobile phone also establishes a wireless connection to another sound box currently, it may be determined that the user wants to play stereo by using two sound boxes. Certainly, after the user may hold the mobile phone to touch the NFC tag on the sound box (for example, a sound box 1), the mobile phone may also directly determine whether the mobile phone is currently connected to another sound box. If the mobile phone is connected to the another sound box (for example, a sound box 2), the mobile phone may determine that an intention of the user to touch the NFC tag by using the mobile phone is to play music synchronously by using the two sound boxes, and that the user wants the two sound boxes to play stereo. Then, when the music currently played on the mobile phone is stereo audio, the mobile phone may synchronize an audio channel (for example, first audio channel data) of the music with one of the sound boxes, and synchronize the other audio channel (for example, second audio channel data) with the other sound box, so that these two sound boxes play stereo. As shown in FIG. 9B, the mobile phone synchronizes a left audio channel of the music "little baby, go to sleep quickly, I will accompany you in a dream . . . " with the sound box 1 for playing, and synchronizes a right audio channel of the music "little baby, go to sleep quickly, I will accompany you in a dream . . . " with the sound box 2 for playing, so that the sound box 1 and the sound box 2 play stereo. For example, with reference to FIG. 8A, as shown in S901 in FIG. 9A, the NFC service module of the mobile phone may read a MAC address that is of the sound box 1 and that is stored in the NFC tag of the sound box 1. As shown in S902 in FIG. 9A, the BT module of the mobile phone may send a BT connection request to a BT module of the sound box 1 based on the MAC address. After receiving the BT connection request, the BT module of the sound box 1 may return a connection response to the BT module of the mobile phone, where the connection response is used to indicate that the sound box 1 accepts the connection request of the mobile phone. Then, the mobile phone establishes a first wireless connection, such as a Bluetooth connection, to the sound box 1. As shown in S903 in FIG. 9A, the NFC service module of the mobile phone may call back a wireless connection management module in the mobile phone to determine whether the mobile phone is further connected to another sound box (or determine whether the mobile phone establishes a wireless connection to another sound box). If it is determined that the mobile phone is connected to another sound box, for example, the mobile phone establishes a second wireless connection, such as a Bluetooth connection, to the sound box 2, the NFC service module of the mobile phone may transmit, to the BT module of the mobile phone, audio that needs to be transmitted, such as first audio channel data (such as left audio channel audio). In this way, as shown in S904 in FIG. 9A, the BT module of the mobile phone may transmit the audio that needs to be transmitted, namely, the left audio channel audio, to the BT module of the sound 1 through the established Bluetooth connection. As shown in S905 in FIG. 9A, the BT module of the mobile phone may transmit the second audio channel data, such as right audio channel audio, to the sound box 2 through the established Bluetooth connection. The first audio channel data and the second audio channel data are two pieces of channel data included in the audio being played on the mobile phone. In this way, the sound box 1 and the sound box 2 can synchronously play the music in the mobile phone, and implement stereo playing. In addition, similar to the description in the foregoing embodiment, an execution sequence of S902 and S903 is not limited in this embodiment. In some embodiments, S902 may be performed first, and then S903 is performed. In some other embodiments, S903 may be performed first, and then S902 is performed.

It can be seen that, after the user touches the NFC tag on the sound box by using the mobile phone, the mobile phone may establish a wireless connection to the sound box, and the mobile phone and the sound box may automatically synchronously play music.

In some other embodiments of this application, the second electronic device may determine, with reference to the current scenario information, the intention of the user to touch the NFC tag by using the first electronic device.

For example, the first electronic device is a mobile phone, and the second electronic device is a computer. The current scenario information may include at least one of the following information: environment information, a current status of the computer, an application status of the computer, or the like. The environment information may include at least one of the following: a time, a geographical location, an ambient temperature, a temperature of the computer, or the like. The current status of the computer may include at least one of the following: whether to play audio, a communication status, a screen-on/off state, or the like. The communication status may include a type of a current wireless connection, for example, a Bluetooth connection, a Wi-Fi connection, or a cellular connection. The application status of the computer may include at least one of the following: a foreground running status of an application, a list of applications whose functions can be automatically implemented by reading information about the NFC tag, or the like.

The computer has an NFC tag. The NFC tag stores connection information used by another device to establish a wireless connection to the computer. For example, the connection information is a MAC address of the computer. After the user holds the mobile phone to touch the NFC tag on the computer, power may be provided for the NFC tag, to activate the NFC tag. In this case, the mobile phone may read the MAC address that is of the computer and that is stored in the NFC tag. The mobile phone may establish a wireless connection to the computer based on the MAC address. In addition, the computer may determine, with reference to the current scenario information, an intention of the user to touch the NFC tag by using the mobile phone, to automatically implement another function with the computer according to the determined intention.

It should be noted that the specific description in this embodiment is similar to the specific description in the embodiment in which the first electronic device determines, with reference to the current scenario information, an intention of the user to touch the NFC tag by using the first electronic device. A difference lies in: devices that determine the intention of the user to touch the NFC tag by using the first electronic device are different. In the embodiment in which the first electronic device determines, with reference to the current scenario information, an intention of the user to touch the NFC tag by using the first electronic device, the device for determining the intention of the user is the first electronic device, but in this embodiment, the device for determining the intention of the user is the second electronic device.

For example, in this embodiment, the mobile phone establishes a Bluetooth connection to the computer. When the user wants to perform projection from the computer to the mobile phone and operates the computer by using the mobile phone, the user may hold the mobile phone to touch the NFC tag on the computer. When the mobile phone works in a reader/writer mode, after the mobile phone touches the NFC tag on the computer, the NFC tag is activated by using the power provided by the mobile phone. In this case, the mobile phone may read the MAC address that is of the computer and that is stored in the NFC tag. The mobile phone may send a page request to the computer based on the MAC address. After receiving the page request, the computer returns a page response to the mobile phone. Therefore, a Bluetooth connection can be established between the mobile phone and the computer.

In addition, the computer may obtain the current scenario information, and determine, based on the obtained scenario information, the intention of the user to touch the NFC tag by using the mobile phone, to automatically implement the another function with the mobile phone according to the determined intention.

Figure 10A:
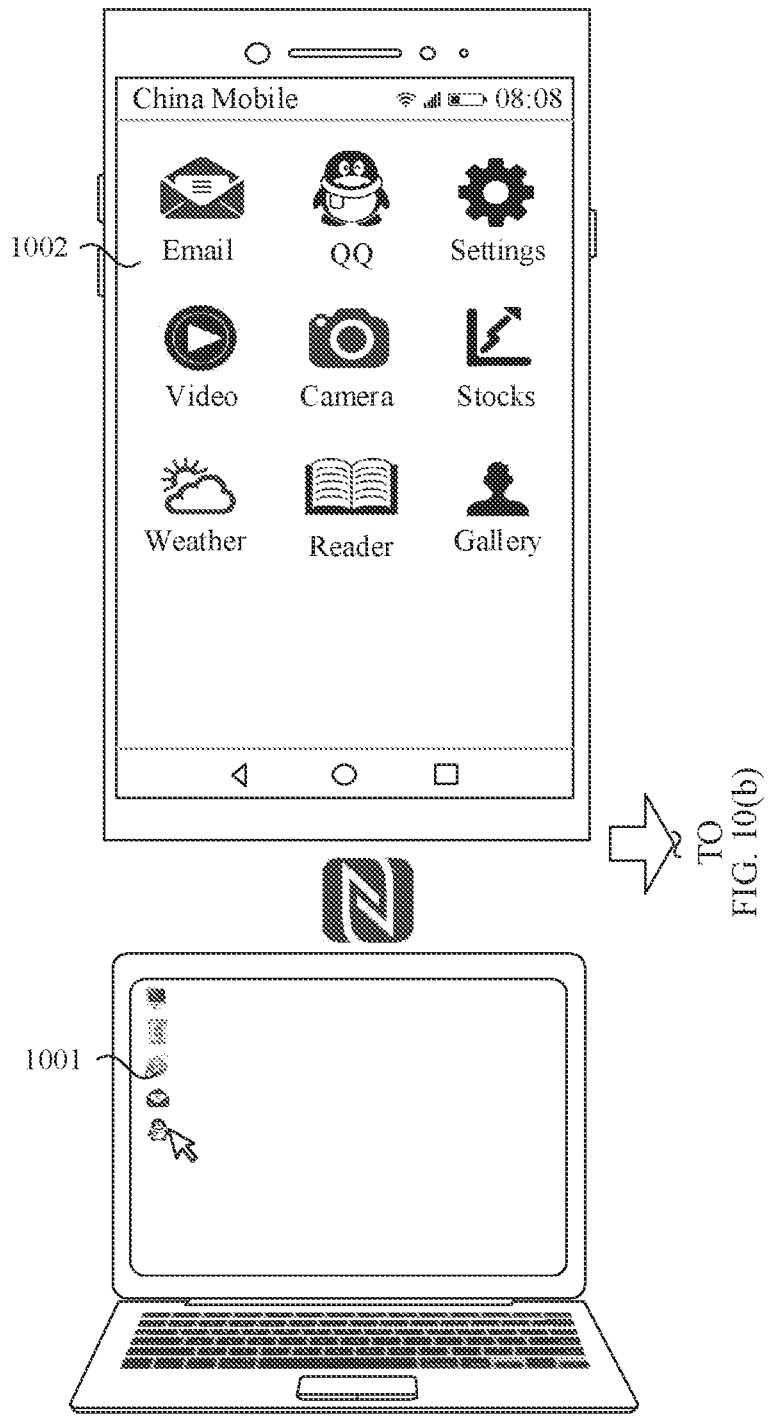
FIG. 10(a) and FIG. 10(b) are a schematic diagram of a still another scenario in which a function is implemented by using an NFC tag according to an embodiment of this application.
Figure 10B:
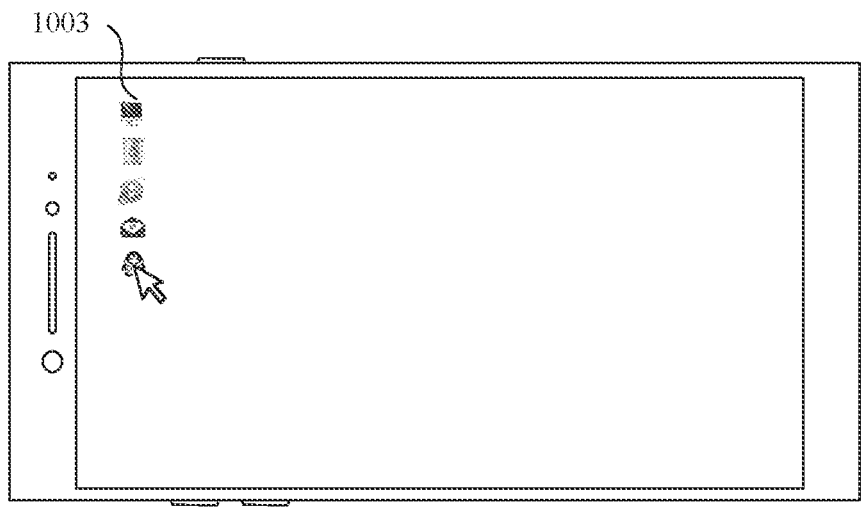

For example, the computer may obtain an application status of the computer. For example, the application status obtained by the computer is: No application is running in the foreground. That is, as shown in FIG. 10(a), the computer currently displays a computer desktop 1001, and no application is running in the foreground. In addition, the mobile phone currently displays a mobile phone home screen 1002. The computer may determine, based on the obtained application status of the computer "no application is running in the foreground", that an intention of the user to touch the NFC tag by using the mobile phone is to perform projection from the computer to the mobile phone, and operate the computer by using the mobile phone. In this case, the computer may project an interface of the computer to the mobile phone according to the determined intention. As shown in FIG. 10(b), the mobile phone synchronously displays the computer desktop, for example, an interface 1003. Then, when the user performs an operation on the interface 1003 displayed on the mobile phone, the mobile phone transmits a control instruction corresponding to the operation to the computer through the established Bluetooth connection, to implement a function of projecting a screen from the computer to the mobile phone and operating the computer by using the mobile phone.

It can be seen that, after the user touches the NFC tag on the computer by using the mobile phone, the mobile phone may establish the wireless connection to the computer, and the computer may project an interface of the computer to the mobile phone, to implement the function of operating the computer by using the mobile phone.

For another example, the mobile phone establishes a Wi-Fi connection to the television. The user is using the computer to view pictures. When the user wants to project (or mirror) a picture on the computer to the mobile phone for viewing, the user may hold the mobile phone to touch the NFC tag on the computer. When the mobile phone works in a reader/writer mode, after the mobile phone touches the NFC tag on the computer, the NFC tag is activated by using the power provided by the mobile phone. In this case, the mobile phone may read the MAC address that is of the computer and that is stored in the NFC tag. The mobile phone may establish a Wi-Fi connection to the computer based on the MAC address.

In addition, the computer may obtain the current scenario information, and determine, based on the obtained scenario information, the intention of the user to touch the NFC tag by using the mobile phone, to automatically implement the another function with the mobile phone according to the determined intention.

Figure 11A:
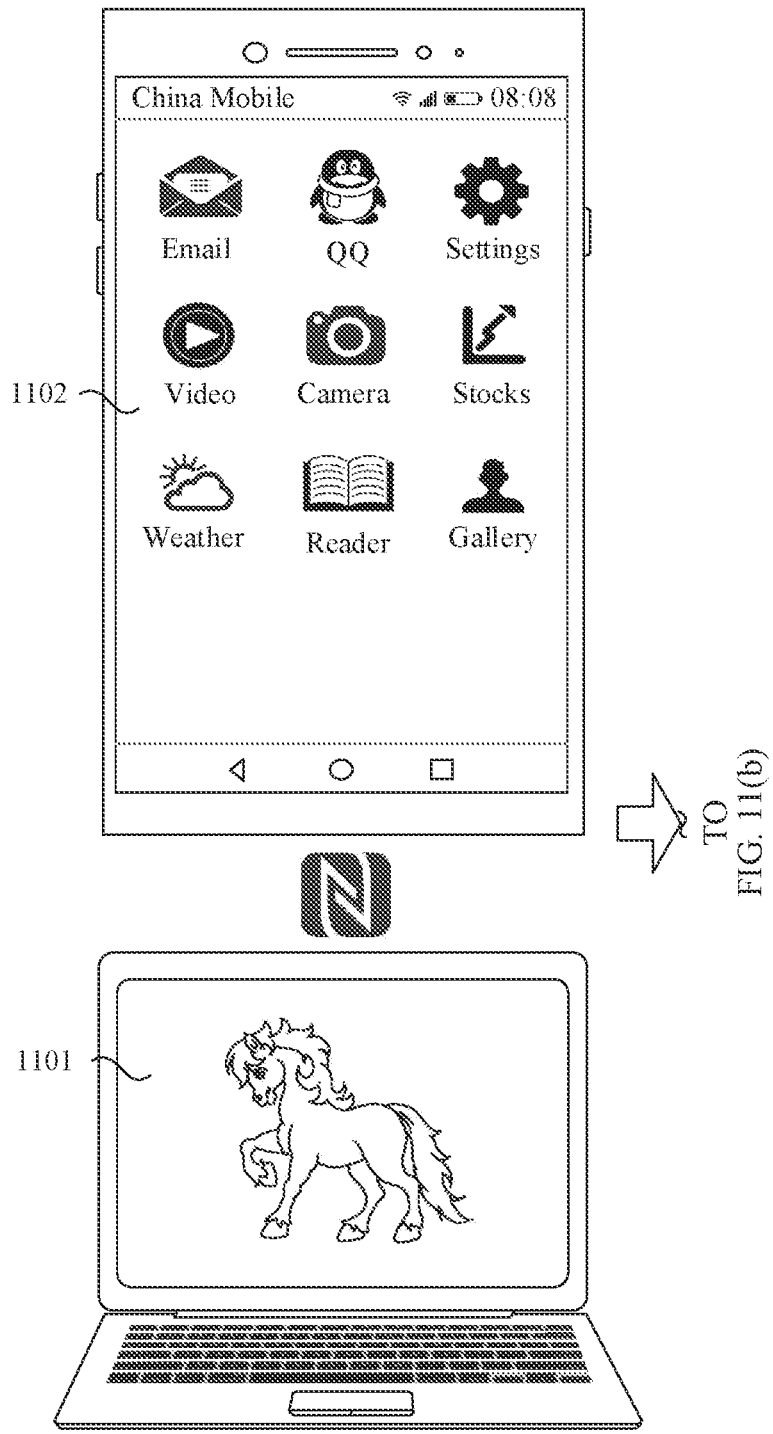
FIG. 11(a) and FIG. 11(b) are a schematic diagram of a still another scenario in which a function is implemented by using an NFC tag according to an embodiment of this application.
Figure 11B:
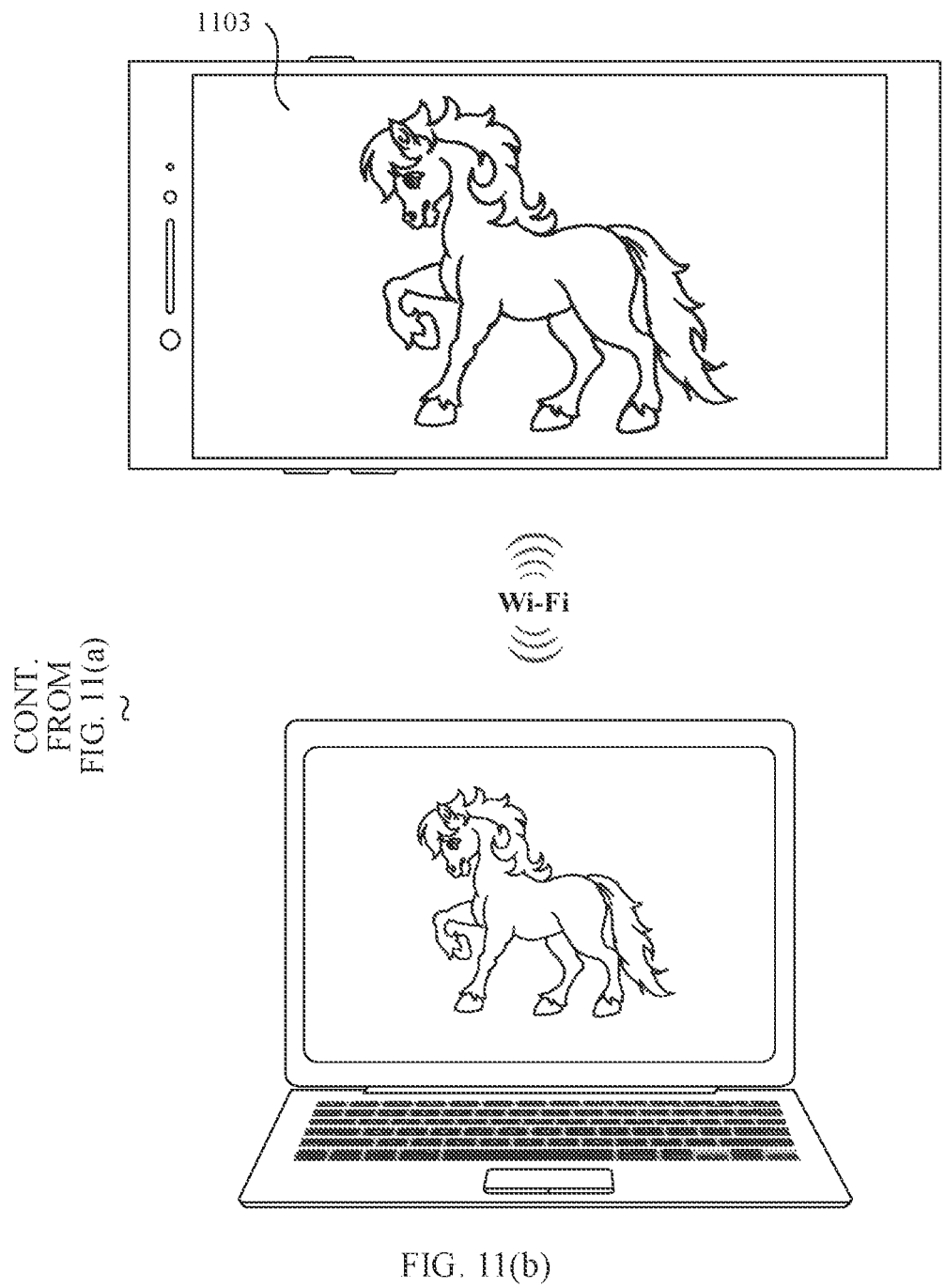

For example, the computer may obtain an application status of the computer. For example, the application status obtained by the computer is: An album application is running in the foreground. That is, as shown in FIG. 11(a), the computer currently displays a picture 1101. In addition, as shown in FIG. 11(a), the mobile phone currently displays a home screen 1102. The computer may determine, based on the obtained application status of the computer "an album application is running in the foreground", that an intention of the user to touch the NFC tag by using the mobile phone is to project a picture on the computer to the mobile phone. Then, the computer may project, according to the determined intention, the picture displayed on the computer to the mobile phone. For example, the computer may project, by using a miracast technology or a DLNA technology, the picture displayed on the computer to the mobile phone for displaying through a Wi-Fi connection established between the computer and the mobile phone. As shown in 1103 in FIG. 11(b), the mobile phone synchronously displays the picture displayed on the computer.

It can be seen that, after the user touches the NFC tag on the computer by using the mobile phone, the mobile phone may establish the wireless connection to the computer, and the computer may synchronize the picture displayed on the computer with the mobile phone for displaying.

It may be understood that, in this embodiment, after the user touches the NFC tag on the second electronic device by using the first electronic device, the first electronic device may not only establish a wireless connection to the second electronic device, but also automatically implement another function. In the foregoing embodiment, an example in which the first electronic device or the second electronic device determines, with reference to the current scenario information, an intention of the user to touch the NFC tag by using the first electronic device, to implement another function according to the determined intention is used to describe an automatic implementation process of the another function. In some other embodiments, correspondences between different scenario information and functions to be implemented may be preconfigured in the electronic device (for example, the first electronic device or the second electronic device). In this way, after the user touches the NFC tag on the second electronic device by using the first electronic device, the first electronic device and the second electronic device may establish a wireless connection, and the electronic device (for example, the first electronic device or the second electronic device) may further determine, by using a preconfigured correspondence with reference to current scenario information, a function that needs to be implemented and corresponds to the scenario information, to complete automatic implementation of another function.

For example, the first electronic device (such as a mobile phone) determines, with reference to current scenario information, a function that needs to be implemented, the scenario information is an application status of the mobile phone, and the second electronic device is a television. A correspondence preconfigured in the mobile phone is shown in Table 1.

TABLE 1

| Application status of the mobile phone | Function that needs to be implemented |
|---|---|
| No application is running in the foreground | Simulate a remote control of the television |

TABLE 1-continued

| Application status of the mobile phone | Function that needs to be implemented |
|---|---|
| A video application is running in the foreground | Screen projection |

A user holds the mobile phone to touch an NFC tag on the television. When the mobile phone works in a reader/writer mode, after the mobile phone touches the NFC tag on the television, the NFC tag is activated by using power provided by the mobile phone. In this case, the mobile phone may read a MAC address that is of the television and that is stored in the NFC tag. The mobile phone may establish a wireless connection to the television based on the MAC address. In addition, the mobile phone may obtain an application status of the mobile phone. With reference to Table 1, a function that needs to be implemented is determined based on the obtained application status of the mobile phone. For example, the application status of the mobile phone that is obtained by the mobile phone is: No application is running in the foreground. In this case, the mobile phone may determine, according to Table 1, that a function that needs to be implemented is to simulate the remote control of the television. In this case, the mobile phone may invoke a remote control application in the mobile phone, and display a remote control interface of the television. For another example, the application status of the mobile phone that is obtained by the mobile phone is: A video application is running in the foreground. In this case, the mobile phone may determine, according to Table 1, that a function that needs to be implemented is screen projection. In this case, the mobile phone may project a video played on the mobile phone to the television for playing through a wireless connection established between the mobile phone and the television.

According to the method provided in this embodiment of this application, after a user touches an NFC tag on another electronic device by using an electronic device (such as a mobile phone) having ran NFC function, a plurality of functions may be simultaneously implemented. In this way, a plurality of functions can be implemented simultaneously through one touch of the user, thereby improving interaction efficiency.

Some other embodiments of this application further provide a computer storage medium. The computer storage medium may include computer instructions. When the computer instructions are run on a first electronic device, the first electronic device is enabled to perform the steps performed by the first electronic device (for example, the mobile phone) in the embodiment corresponding to any one of FIG. 5(a), FIG. 5(b), FIG. 6A, FIG. 6B(a), FIG. 6B(b), FIG. 7(a), FIG. 7(b), FIG. 8A, FIG. 8B(a), FIG. 8B(b), FIG. 9A, and FIG. 9B. Alternatively, when the computer instructions are run on a second electronic device, the second electronic device is enabled to perform the steps performed by the second electronic device (for example, the computer) in the embodiment corresponding to FIG. 10(a) and FIG. 10(b), or FIG. 11(a) and FIG. 11(b).

Some other embodiments of this application further provide a computer program product. When the computer program product is run on a computer, the computer is enabled to perform the steps performed by the first electronic device (such as the mobile phone) in the embodiment corresponding to any one of FIG. 5(a), FIG. 5(b), FIG. 6A, FIG. 6B(a), FIG. 6B(b), FIG. 7(a), FIG. 7(b), FIG. 8A, FIG. 8B(a), FIG. 8B(b), FIG. 9A, and FIG. 9B, or the computer is enabled to perform the steps performed by the second electronic device (such as the computer) in the embodiment corresponding to FIG. 10(a) and FIG. 10(b), or FIG. 11(a) and FIG. 11(b).

Some other embodiments of this application further provide a chip system. The chip system may be applied to a first electronic device having an NFC function. The chip system may include one or more interface circuits and one or more processors. The interface circuit and the processor are interconnected by using a line. The interface circuit is configured to receive a signal from a memory of the first electronic device, and send the signal to the processor, where the signal includes computer instructions stored in the memory. When the processor executes the computer instructions, the first electronic device performs the method in the embodiment corresponding to any one of FIG. 5(a), FIG. 5(b), FIG. 6A, FIG. 6B(a), FIG. 6B(b), FIG. 7(a), FIG. 7(b), FIG. 8A, FIG. 8B(a), FIG. 8B(b), FIG. 9A, and FIG. 9B.

Some other embodiments of this application further provide a chip system. The chip system may be applied to a second electronic device having an NFC tag. The chip system may include one or more interface circuits and one or more processors. The interface circuit and the processor are interconnected by using a line. The interface circuit is configured to receive a signal from a memory of the second electronic device, and send the signal to the processor, where the signal includes computer instructions stored in the memory. When the processor executes the computer instructions, the second electronic device performs the method in the embodiment corresponding to FIG. 10(a) and FIG. 10(b), or FIG. 11(a) and FIG. 11(b).

Some other embodiments of this application further provide a wireless communications apparatus. The apparatus has a function of implementing behavior of the first electronic device (for example, the mobile phone) in the embodiment corresponding to any one of FIG. 5(a), FIG. 5(b), FIG. 6A, FIG. 6B(a), FIG. 6B(b), FIG. 7(a), FIG. 7(b), FIG. 8A, FIG. 8B(a), FIG. 8B(b), FIG. 9A, and FIG. 9B. The function may be implemented by hardware, or may be implemented by hardware executing corresponding software. The hardware or the software includes one or more modules corresponding to the foregoing function, for example, an NFC unit or module, an intelligent unit or module, and a connection unit or module.

Figure 12:
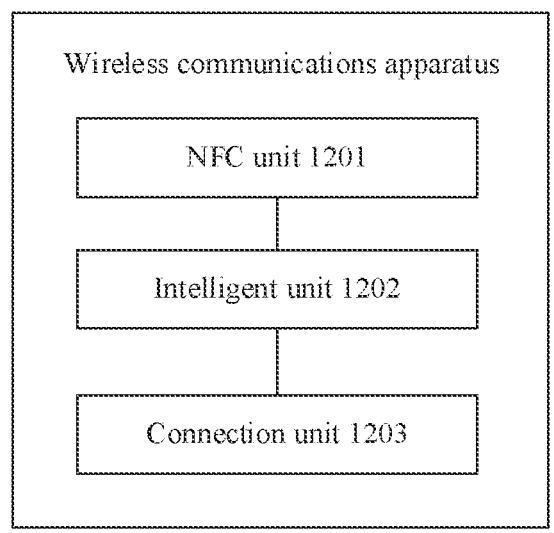
FIG. 12 is a schematic diagram of composition of a wireless communications apparatus according to an embodiment of this application.

As shown in FIG. 12, the apparatus may include an NFC unit 1201, an intelligent unit 1202, and a connection unit 1203.

In an example, the NFC unit 1201 is configured to: when a user touches an NFC tag of a second electronic device by using a first electronic device, read connection information stored in the NFC tag.

The connection unit 1203 is configured to establish a wireless connection to the second electronic device based on the read connection information.

The intelligent unit 1202 is configured to obtain current scenario information, and determine, based on the current scenario information, that an intention of the user to touch the NFC tag of the second electronic device by using the first electronic device is to project a video being played on the first electronic device to the second electronic device for playing.

The connection unit 1203 is further configured to send video data to the second electronic device through the wireless connection, where the video data is data of the video being played on the first electronic device.

For example, the intelligent unit 1202 may include an input module, an AI module, and an output module. The input module is configured to obtain the current scenario information, to transmit the current scenario information to the AI module. The AI module is configured to determine, based on the current scenario information, that an intention of the user to touch the NFC tag of the second electronic device by using the first electronic device is to project the video being played on the first electronic device to the second electronic device for playing, and the output module outputs the video. In this way, the connection unit 1203 may send the video data to the second electronic device through the wireless connection based on the output of the output module.

Further, that the connection unit 1203 sends the video data to the second electronic device through the wireless connection may include: The connection unit 1203 sends the video data to the second electronic device through the wireless connection by using a miracast technology or a DLNA technology.

Further, the current scenario information includes at least one of the following: environment information, a current status of the first electronic device, or an application status of the first electronic device. The environment information includes at least one of the following: a time, a geographical location, an ambient temperature, or a temperature of the first electronic device: the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

In another example, the NFC unit 1201 is configured to: when a user touches an NFC tag of a second electronic device by using a first electronic device, read connection information stored in the NFC tag.

The connection unit 1203 is configured to establish a first wireless connection to the second electronic device based on the read connection information.

The intelligent unit 1202 is configured to determine that the first electronic device establishes a second wireless connection to a third electronic device.

The connection unit 1203 is further configured to send first audio channel data to the second electronic device through the first wireless connection, and send second audio channel data to the third electronic device through the second wireless connection. The first audio channel data and the second audio channel data are two pieces of audio channel data included in audio being played on the first electronic device, so that the second electronic device and the third electronic device implement stereo audio output.

Further, the intelligent unit 1202 is further configured to: obtain current scenario information, and determine, based on the current scenario information, that an intention of the user to touch the NFC tag of the second electronic device by using the first electronic device is to synchronize the audio being played on the first electronic device with the second electronic device for playing.

For example, the intelligent unit 1202 may include an input module, an AI module, and an output module. The input module is configured to obtain the current scenario information, to transmit the current scenario information to the AI module. The AI module is configured to determine, based on the current scenario information, that an intention of the user to touch the NFC tag of the second electronic device by using the first electronic device is to synchronize the audio being played on the first electronic device with the second electronic device for playing, and the output module outputs the audio. In this way, the connection unit 1203 sends the first audio channel data to the second electronic device and sends the second audio channel data to the third electronic device based on the output of the output module and a result of determining that the first electronic device establishes the second wireless connection to the third electronic device.

Further, the current scenario information includes at least one of the following: environment information, a current status of the first electronic device, or an application status of the first electronic device. The environment information includes at least one of the following: a time, a geographical location, an ambient temperature, or a temperature of the first electronic device; the current status of the first electronic device includes at least one of the following: whether to play audio, a communication status, or a screen-on/off state, where the communication status includes a type of a current wireless connection; and the application status of the first electronic device includes at least one of the following: a foreground running status of an application, or a list of applications whose functions can be automatically implemented by reading information about the NFC tag.

Further, both the second electronic device and the third electronic device are sound boxes: or both the first wireless connection and the second wireless connection are Bluetooth connections.

Figure 10B:
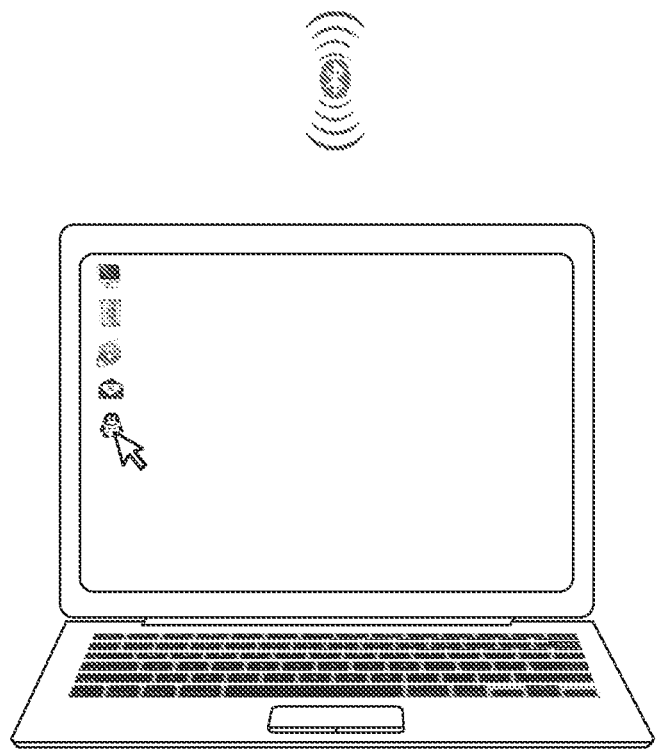

In addition, as described in the foregoing embodiment corresponding to FIG. 10(*a*) and FIG. 10(*b*), or FIG. 11(*a*) and FIG. 11(*b*), the second electronic device may alternatively determine, with reference to the current scenario information, an intention of the user to touch the NFC tag by using the first electronic device. That is, some other embodiments of this application further provide an apparatus. The apparatus has a function of implementing behavior of the second electronic device (for example, the computer) in the embodiment corresponding to FIG. 10(*a*) and FIG. 10(*b*), or FIG. 11(*a*) and FIG. 11(*b*). The function may be implemented by hardware, or may be implemented by hardware executing corresponding software. The hardware or the software includes one or more modules corresponding to the foregoing function, for example, an intelligent unit or module, and a connection unit or module. For specific descriptions of the intelligent unit or module and the connection unit or module, refer to specific descriptions of corresponding content in the embodiment shown in FIG. 12. Details are not described herein again.

Figure 5B:
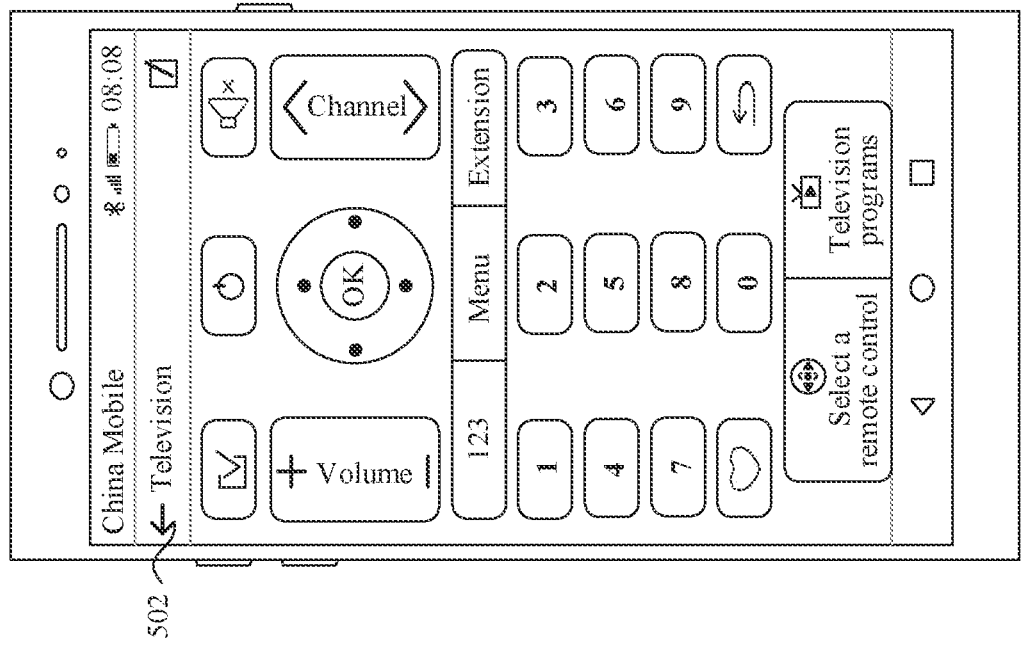
Figure 6A:
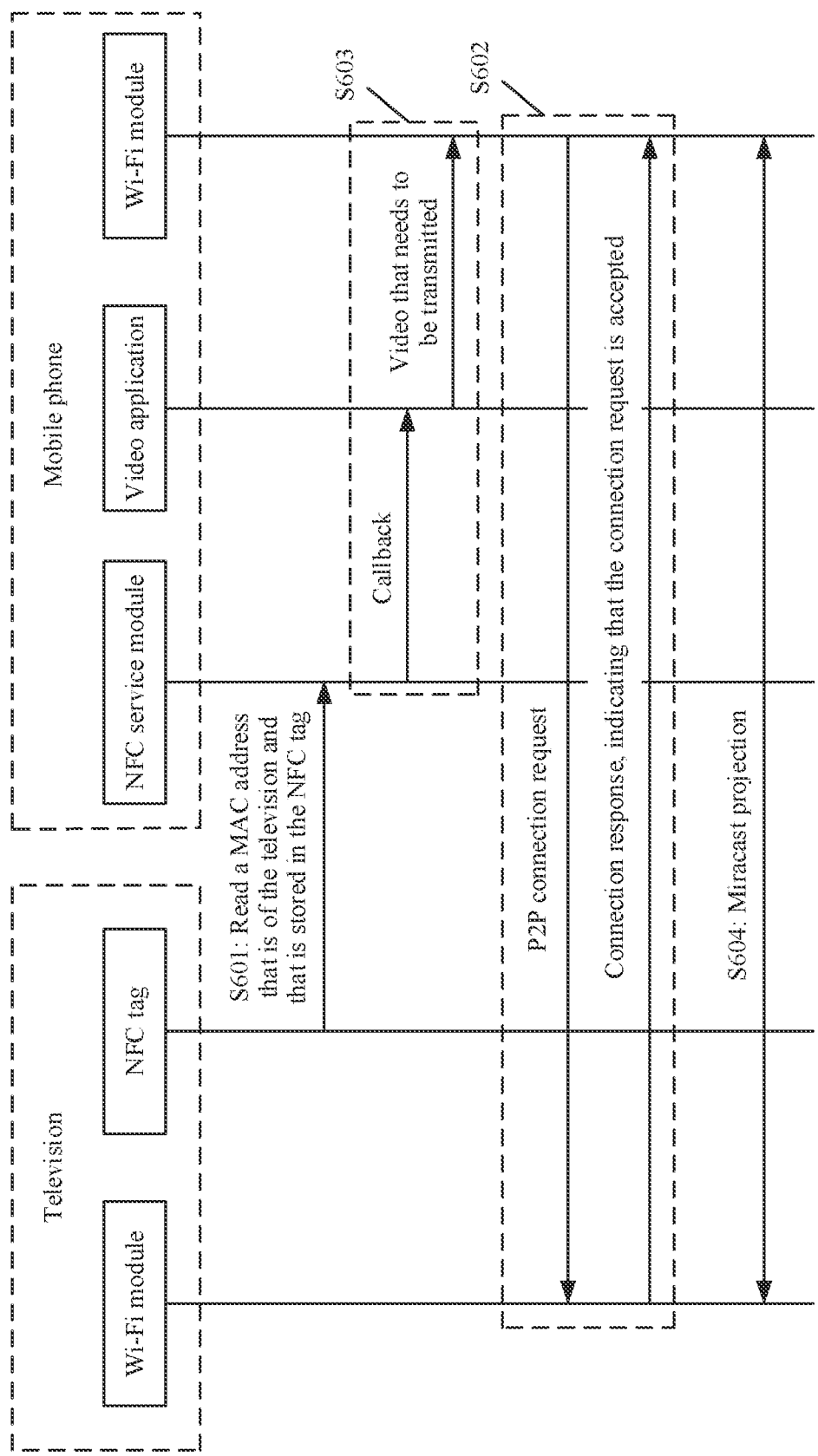
FIG. 6A is a schematic flowchart of implementing functions by using an NFC tag according to an embodiment of this application.
Figure 6B:
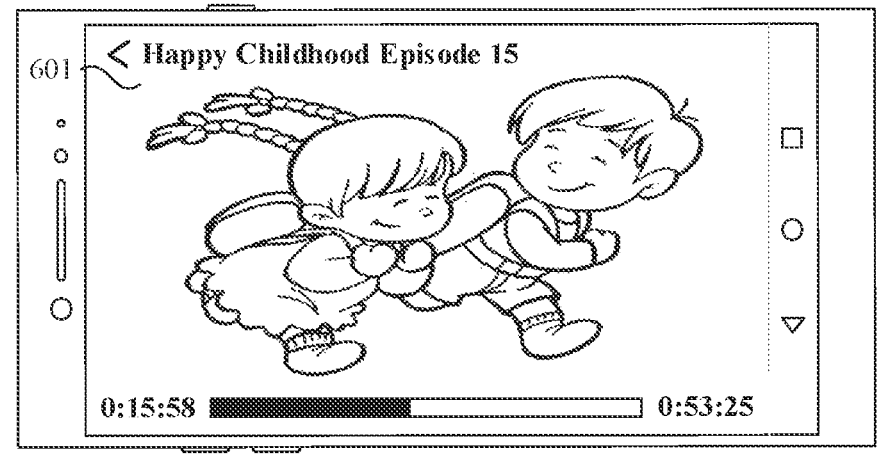
FIG. 6B(a) and FIG. 6B(b) are a schematic diagram of another scenario in which a function is implemented by using an NIT tag according to an embodiment of this application.
Figure 6B:
Figure 6B:
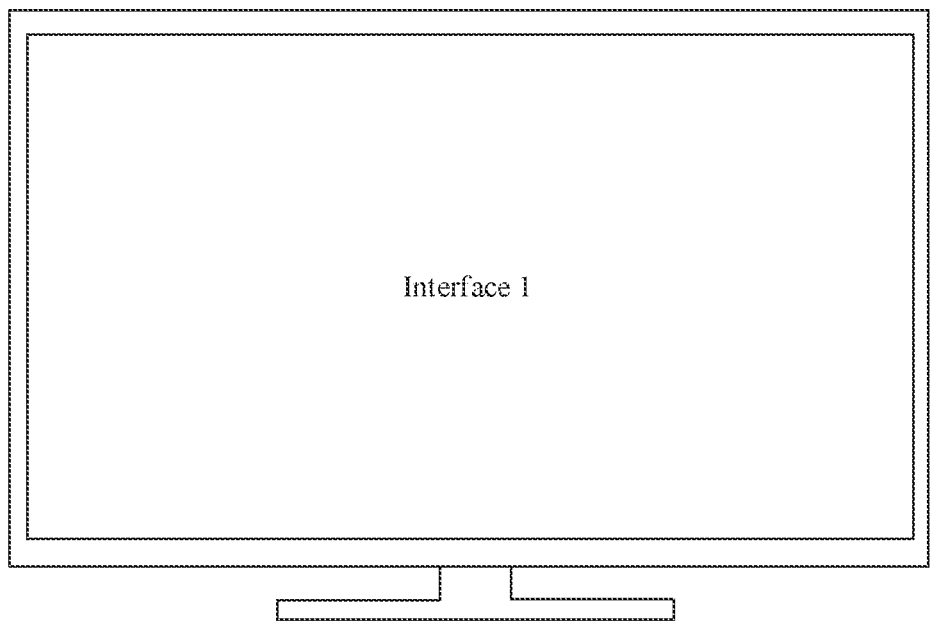
Figure 6B:
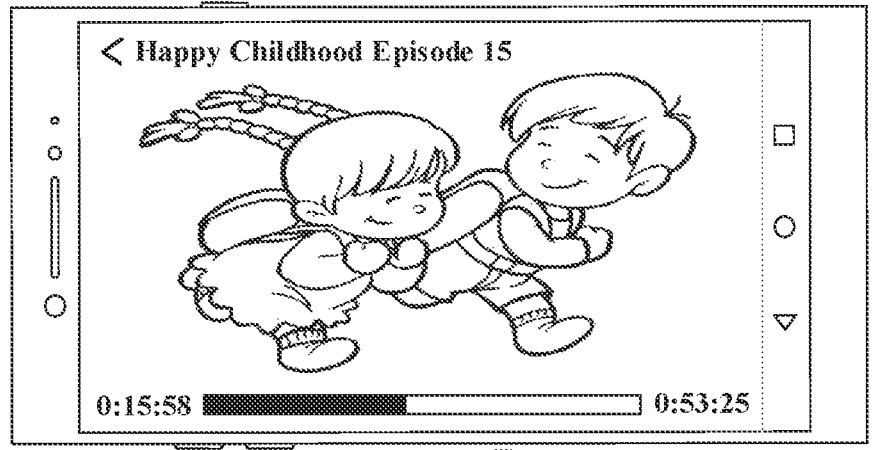
Figure 6B:
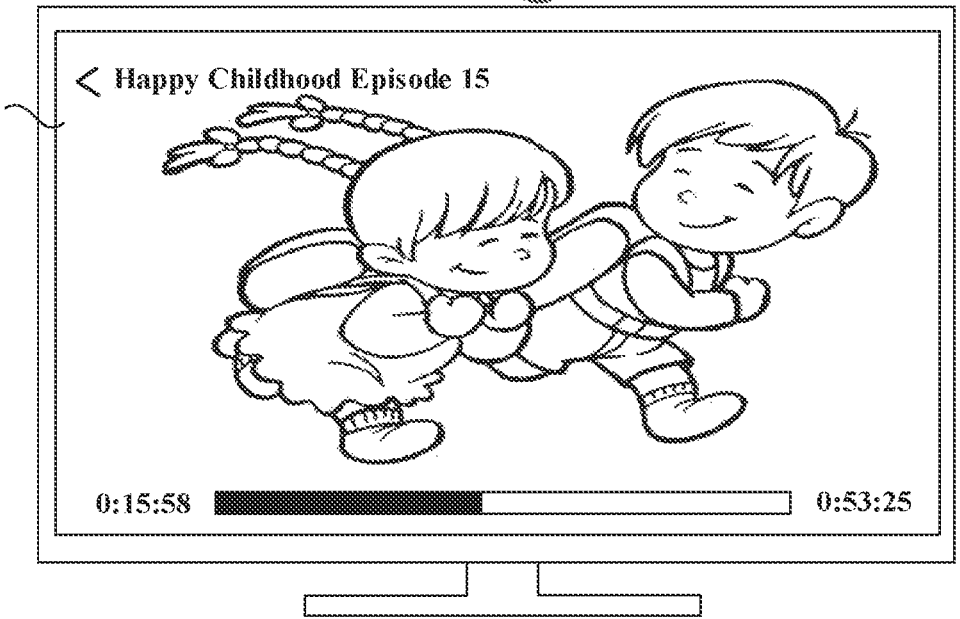
Figure 8A:
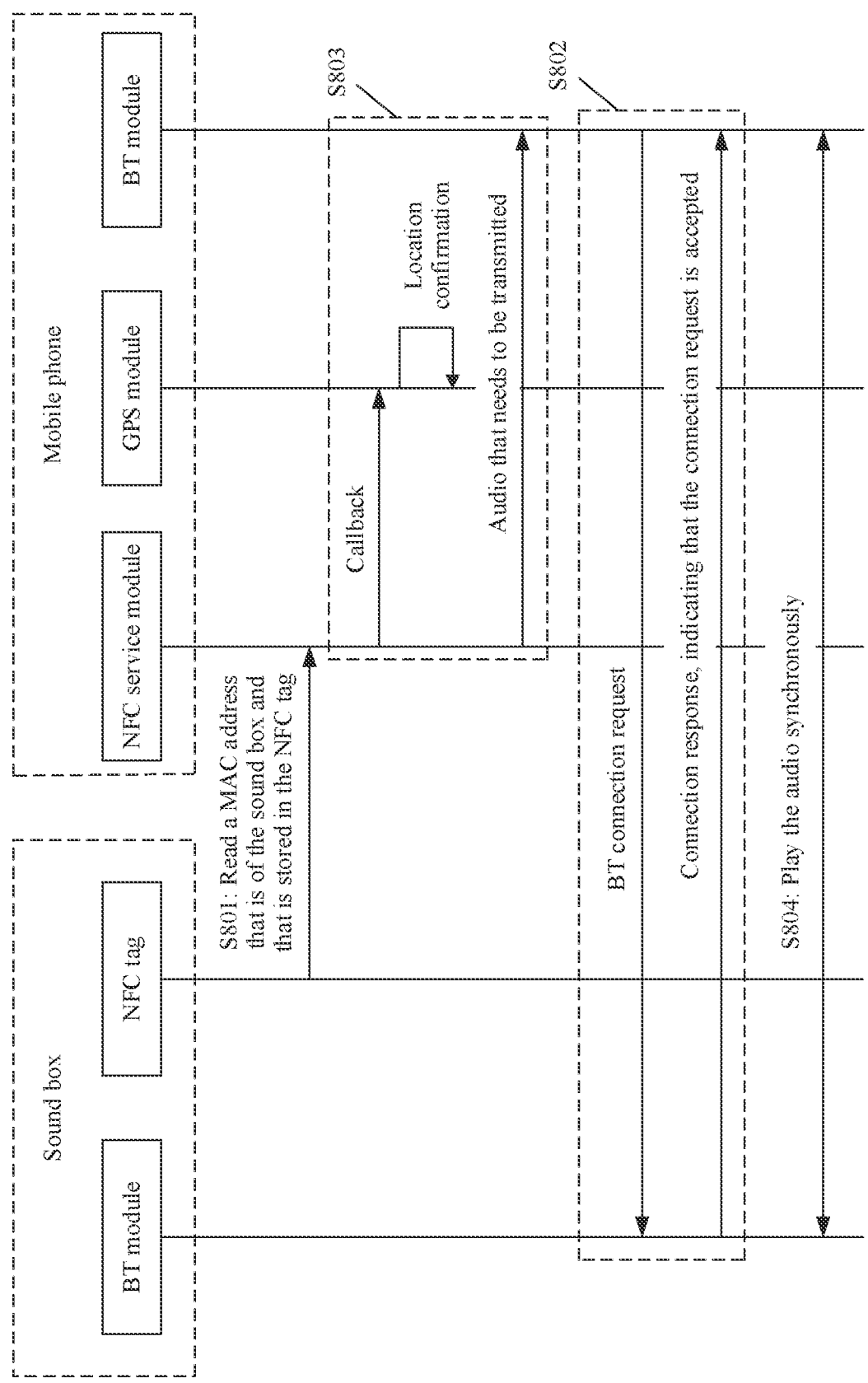
FIG. 8A is another schematic flowchart of implementing functions by using an NFC tag according to an embodiment of this application.
Figure 8B:
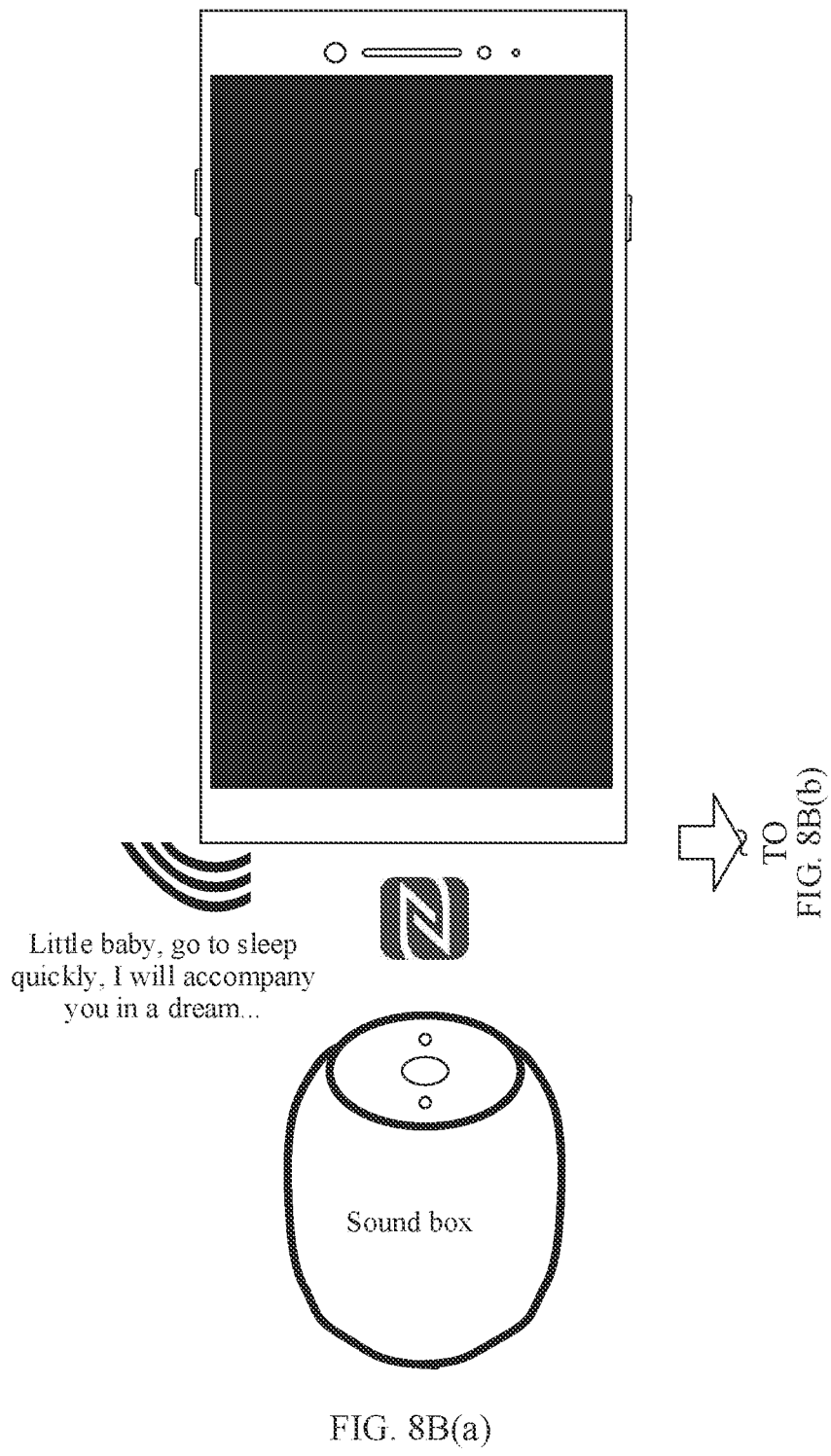
FIG. 8B(a) and FIG. 8B(b) are a schematic diagram of a still another scenario in which a function is implemented by using an NFC tag according to an embodiment of this application.
Figure 8B:
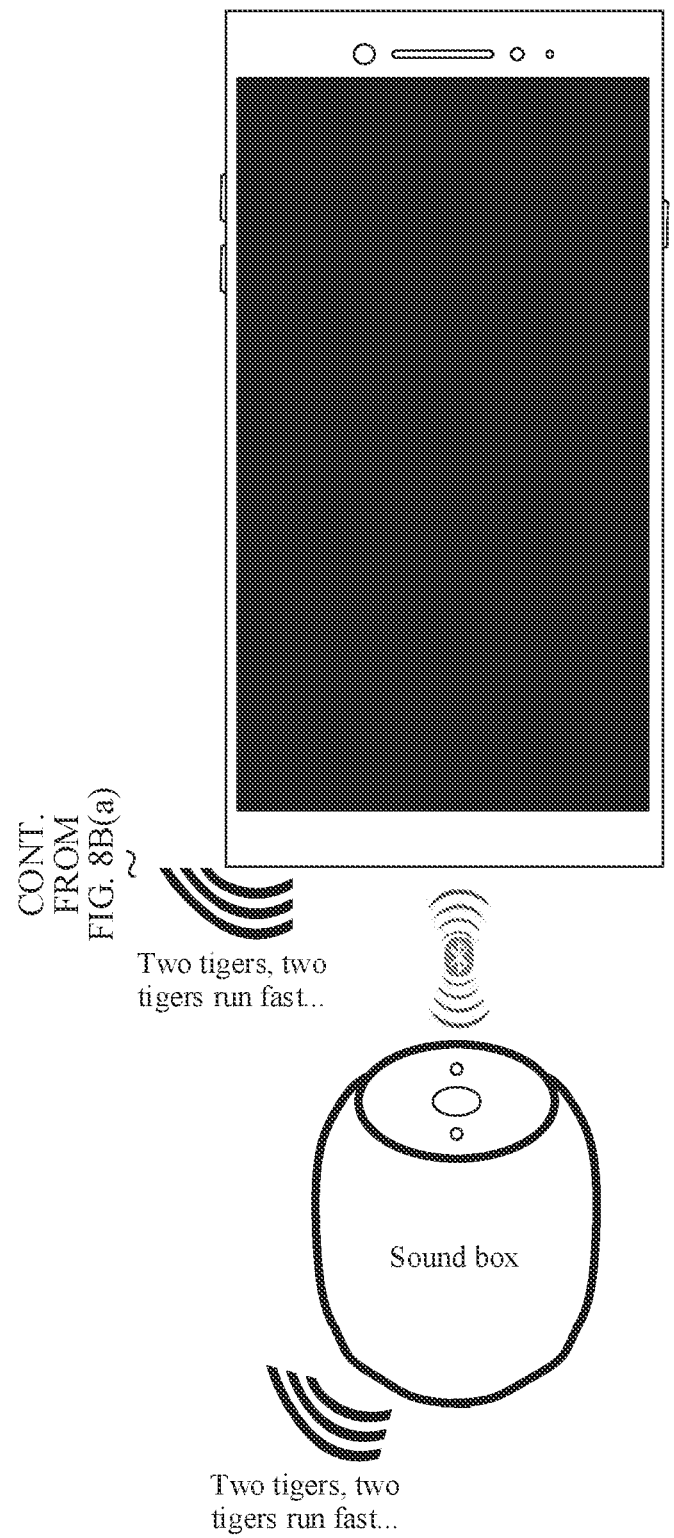
Figure 9A:
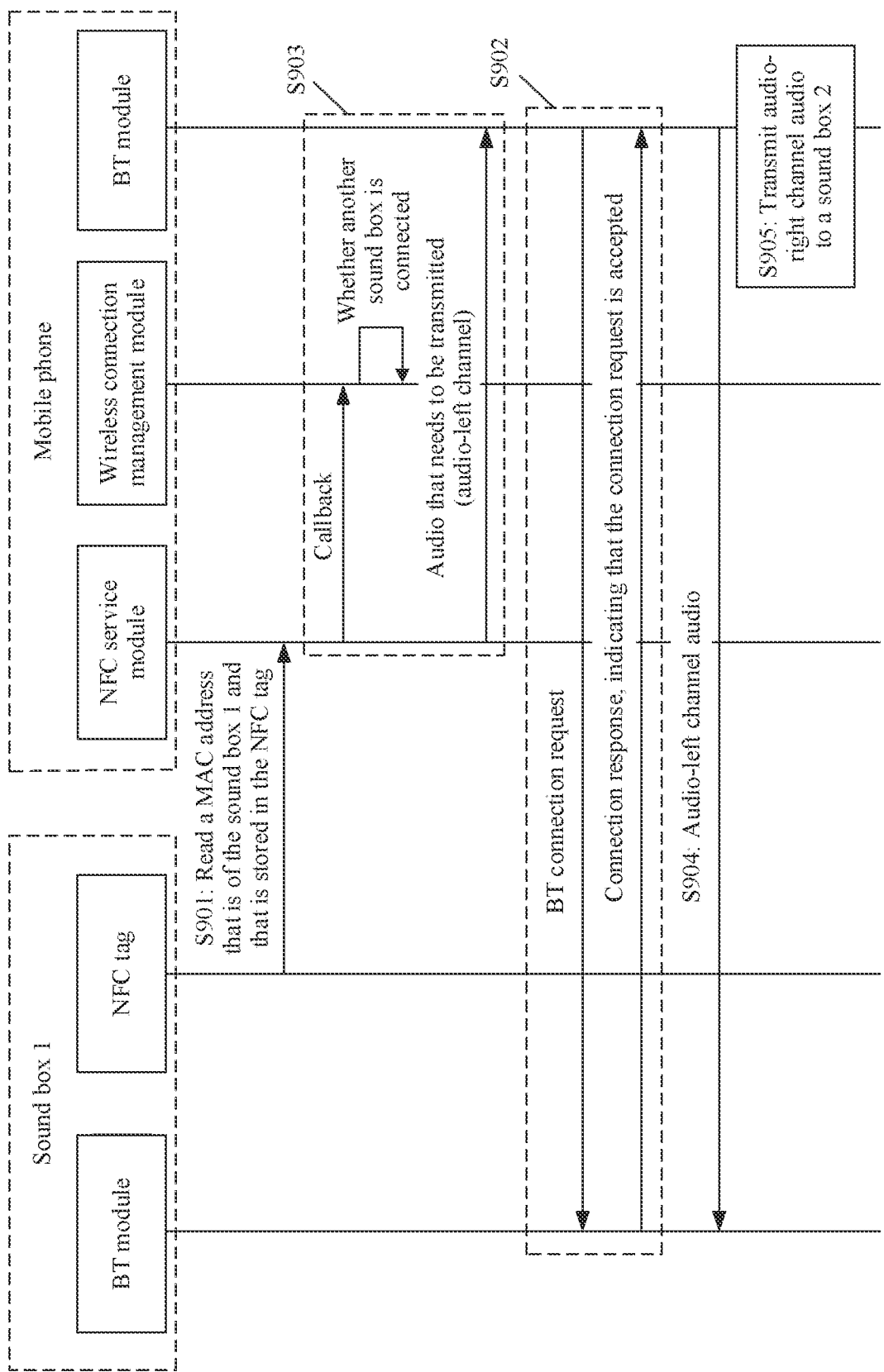
FIG. 9A is a still another schematic flowchart of implementing functions by using an NFC tag according to an embodiment of this application.
Figure 9B:
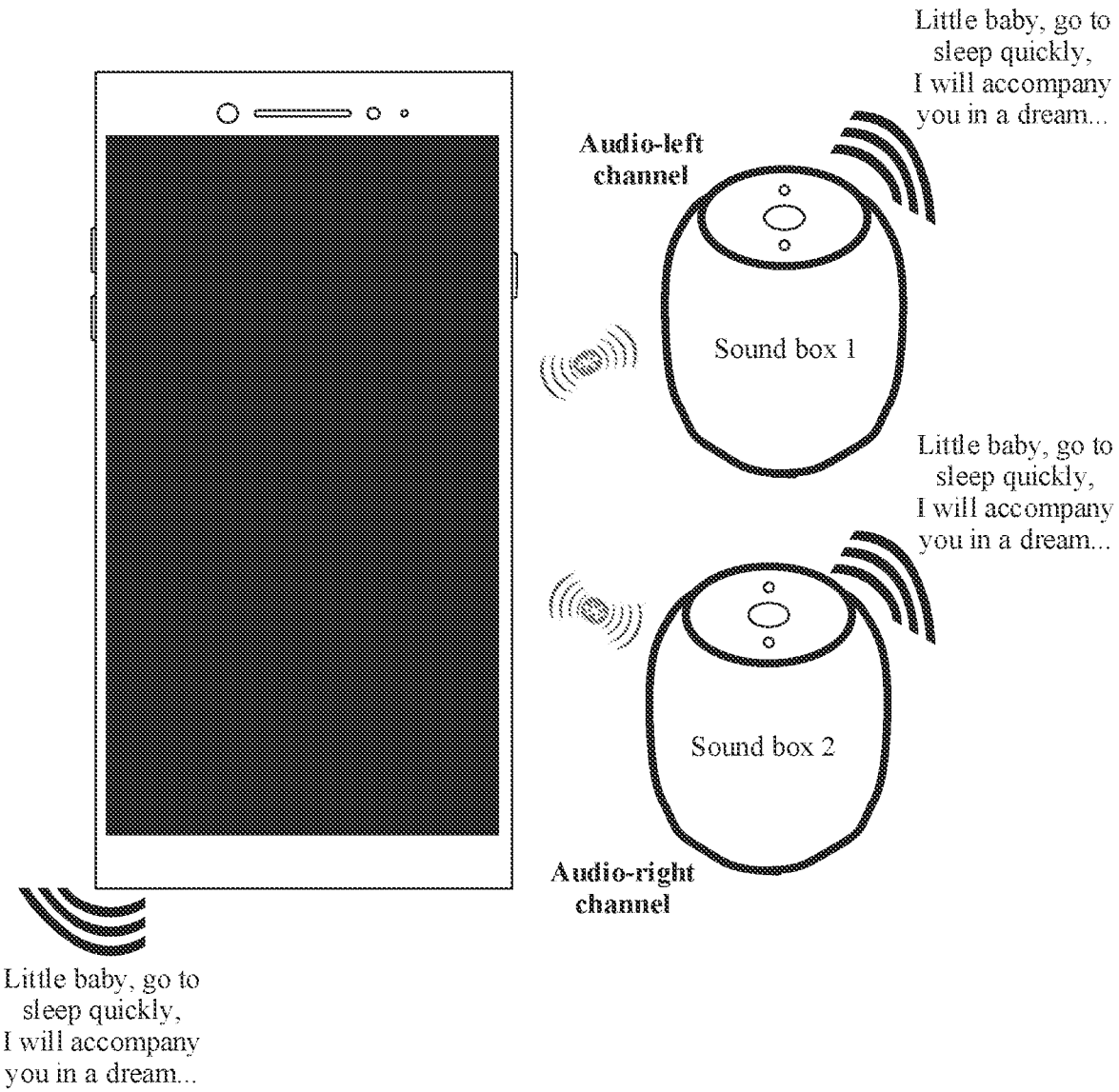
FIG. 9B is a schematic diagram of another scenario in which a function is implemented by using an NFC tag according to an embodiment of this application.

The computer storage medium, the computer program product, the wireless communications apparatus, and the chip system according to the embodiments of this application are configured to perform the methods in the embodiment corresponding to any one of FIG. 5(*a*), FIG. 5(*b*), FIG. 6A, FIG. 6B(*a*), FIG. 6B(*b*), FIG. 7(*a*), FIG. 7(*b*), FIG. 8A, FIG. 8B(*a*), FIG. 8B(*b*), FIG. 9A, FIG. 9B, FIG. 10(*a*), FIG. 10(*b*), FIG. 11(*a*), and FIG. 11(*b*). Therefore, a same effect can be achieved, and details are not described herein again.

The foregoing descriptions about the implementations allow a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other similar forms.

The units described as separate components may or may not be physically separate, and components displayed as units may be one or more physical units, in other words, may be located in one place, or may be distributed on a plurality of different places. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A near-field communication (NFC) system comprising:
a third electronic device;
a second electronic device comprising an NFC tag;
a first electronic device comprising an NFC function and configured to:
when a user touches the NFC tag using the first electronic device:
read connection information stored in the NFC tag;
obtain current scenario information, wherein the current scenario information comprises an application status of the first electronic device, and wherein the application status comprises a list of applications having functions that can be automatically implemented by reading information about the NFC tag;
determine, based on the current scenario information, that an intention of the user to touch the NFC tag using the first electronic device is to synchronize first audio for playing with the second electronic device; and
establish a first wireless connection to the second electronic device based on the connection information;
establish a second wireless connection to the third electronic device;
send first audio channel data to the second electronic device through the first wireless connection; and
send second audio channel data to the third electronic device through the second wireless connection,
wherein the first audio channel data and the second audio channel data are two pieces of third audio channel data comprised in the first audio for playing on the first electronic device,
wherein the second electronic device is configured to:
receive the first audio channel data through the first wireless connection; and
play the first audio channel data to implement stereo audio output, and
wherein the third electronic device is configured to:
receive the second audio channel data through the second wireless connection; and
play the second audio channel data to implement the stereo audio output.

2. The NFC system of claim 1, wherein the current scenario information comprises environment information comprising at least one of a time, a geographical location, an ambient temperature, or a temperature of the first electronic device.

3. The NFC system of claim 1, wherein the second electronic device and the third electronic device are sound boxes, or wherein the first wireless connection and the second wireless connection are BLUETOOTH connections.

4. The NFC system of claim 3, wherein the first electronic device is further configured to send a first BLUETOOTH connection request to the second electronic device, and wherein the second electronic device is further configured to:
receive the first BLUETOOTH connection request; and
establish a first BLUETOOTH connection with the first electronic device.

5. The NFC system of claim 3, wherein the first electronic device is further configured to send a second BLUETOOTH connection request to the third electronic device, and wherein the third electronic device is further configured to:
receive the second BLUETOOTH connection request; and
establish a second BLUETOOTH connection with the first electronic device.

6. The NFC system of claim 1, wherein the current scenario information further comprises a current status of the first electronic device comprising at least one of whether to play a second audio, a communication status comprising a type of a current wireless connection, or a screen-on/off state.

7. The NFC system of claim 1, wherein the application status further comprises a foreground running status of an application.

8. A first electronic device having a near-field communication (NFC) function and comprising:
- a memory configured to store computer instructions; and
- a processor coupled to the memory, wherein when executed by the processor, the computer instructions cause the first electronic device to:
  - when a user touches an NFC tag of a second electronic device using the first electronic device:
    - read connection information stored in the NFC tag;
    - obtain current scenario information, wherein the current scenario information comprises an application status of the first electronic device, and wherein the application status comprises a list of applications having functions that can be automatically implemented by reading information about the NFC tag;
    - determine, based on the current scenario information, that an intention of the user to touch the NFC tag is to synchronize first audio for playing with the second electronic device; and
    - establish a first wireless connection to the second electronic device based on the connection information; and
  - establish a second wireless connection to a third electronic device;
  - send first audio channel data to the second electronic device through the first wireless connection for a stereo audio output; and
  - send second audio channel data to the third electronic device through the second wireless connection for the stereo audio output,
  - wherein the first audio channel data and the second audio channel data are two pieces of third audio channel data comprised in the first audio for playing on the first electronic device.

9. The first electronic device of claim 8, wherein the current scenario information comprises at least one of:
- environment information comprising at least one of a time, a geographical location, an ambient temperature, or a temperature of the first electronic device;
- a current status of the first electronic device comprising at least one of whether to play a second audio, a communication status comprising a type of a current wireless connection, or a screen-on/off state; or
- wherein the application status further comprises at least one of a foreground running status of an application.

10. The first electronic device of claim 8, wherein the second electronic device and the third electronic device are sound boxes, or wherein the first wireless connection and the second wireless connection are BLUETOOTH connections.

11. The first electronic device of claim 10, wherein the first electronic device is further configured to send a first BLUETOOTH connection request to the second electronic device, and wherein the second electronic device is further configured to:
- receive the first BLUETOOTH connection request; and
- establish a first BLUETOOTH connection with the first electronic device.

12. The first electronic device of claim 10, wherein the first electronic device is further configured to send a second BLUETOOTH connection request to the third electronic device, and wherein the third electronic device is further configured to:
- receive the second BLUETOOTH connection request; and
- establish a second BLUETOOTH connection with the first electronic device.

13. The first electronic device of claim 8, wherein the current scenario information further comprises a current status of the first electronic device comprising at least one of whether to play a second audio, a communication status comprising a type of a current wireless connection, or a screen-on/off state.

14. The first electronic device of claim 8, wherein the application status further comprises a foreground running status of an application.

15. A method applied to a first electronic device having a near-field communication (NFC) function, wherein the method comprises:
- when a user touches an NFC tag of a second electronic device using the first electronic device:
  - reading connection information stored in the NFC tag;
  - obtaining current scenario information, wherein the current scenario information comprises an application status of the first electronic device, and wherein the application status comprises a list of applications having functions that can be automatically implemented by reading information about the NFC tag;
  - determining, based on the current scenario information, that an intention of the user to touch the NFC tag is to synchronize first audio for playing with the second electronic device; and
  - establishing a first wireless connection to the second electronic device based on the connection information; and
- establishing a second wireless connection to a third electronic device;
- sending first audio channel data to the second electronic device through the first wireless connection for a stereo audio output; and
- sending second audio channel data to the third electronic device through the second wireless connection for the stereo audio output,
- wherein the first audio channel data and the second audio channel data are two pieces of third audio channel data comprised in the first audio for playing on the first electronic device.

16. The method of claim 15, wherein the current scenario information comprises at least one of:
- environment information comprising at least one of a time, a geographical location, an ambient temperature, or a temperature of the first electronic device;
- a current status of the first electronic device comprising at least one of whether to play a second audio, a communication status comprising a type of a current wireless connection, or a screen-on/off state; or
- wherein the application status further comprises at least one of a foreground running status of an application.

17. The method of claim 15, wherein the second electronic device and the third electronic device are sound boxes, or wherein the first wireless connection and the second wireless connection are BLUETOOTH connections.

18. The method of claim 17, further comprising sending a first BLUETOOTH connection request to the second electronic device for establishing a first BLUETOOTH connection with the first electronic device.

19. The method of claim 18, further comprising sending a second BLUETOOTH connection request to the third electronic device for establishing a second BLUETOOTH connection with the first electronic device.

20. The method of claim 15, wherein the current scenario information further comprises a current status of the first electronic device comprising at least one of whether to play a second audio, a communication status comprising a type of a current wireless connection, or a screen-on/off state.

* * * * *